(12) United States Patent
Moriwaki

(10) Patent No.: US 12,725,235 B2
(45) Date of Patent: Sep. 1, 2026

(54) IMAGE PROCESSING APPARATUS, INFORMATION PROCESSING SYSTEM, IMAGE PROCESSING METHOD, AND STORAGE MEDIUM

(71) Applicant: Atsushi Moriwaki, Tokyo (JP)

(72) Inventor: Atsushi Moriwaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 18/741,578

(22) Filed: Jun. 12, 2024

(65) Prior Publication Data

US 2025/0005726 A1 Jan. 2, 2025

(30) Foreign Application Priority Data

Jun. 27, 2023 (JP) ................................ 2023-105426

(51) Int. Cl.
*G06T 5/92* (2024.01)
*G06T 7/90* (2017.01)
*G06V 10/56* (2022.01)

(52) U.S. Cl.
CPC .................. *G06T 5/92* (2024.01); *G06T 7/90* (2017.01); *G06V 10/56* (2022.01); *G06T 2207/10024* (2013.01)

(58) Field of Classification Search
CPC ... G06T 5/92; G06T 7/90; G06T 2207/10024; G06V 10/56; H04N 1/6036; H04N 1/6033
See application file for complete search history.

(56) References Cited

U.S. PATENT DOCUMENTS 6,522,778 B1 * 2/2003 Tamagawa ............... H04N 1/60 382/167
8,681,375 B2 * 3/2014 Katayama ............ H04N 1/6055 358/1.9

(Continued)

FOREIGN PATENT DOCUMENTS

EP 4171004 A1 4/2023
JP 2008-288722 A 11/2008

(Continued)

OTHER PUBLICATIONS

European Search Report; Application EP24182362; Nov. 29, 2024.

*Primary Examiner* — Jonathan A Boyd
(74) *Attorney, Agent, or Firm* — Duft & Bornsen, PC

(57) ABSTRACT

An image processing apparatus performs color matching of gradation values of the same target color acquired in each of two different states. The image processing apparatus includes processing circuitry. The processing circuitry acquires, in a first state, first color values of patches respectively corresponding to first gradation values and second color values of patches respectively corresponding to second gradation values. The processing circuitry acquires, in a second state, third color values of patches respectively corresponding to the first gradation values. The processing circuitry calculates a first corrected gradation value. The processing circuitry acquires, in the second state, a fourth color value of a patch corresponding to the first corrected gradation value and fifth color values of patches corresponding to third gradation values. The processing circuitry acquires calculates a second corrected gradation value.

13 Claims, 26 Drawing Sheets

(56) References Cited

U.S. PATENT DOCUMENTS

| | | | | |
|---|---|---|---|---|
| 10,291,826 | B2 * | 5/2019 | Yoshida | G06K 15/129 |
| 2012/0081768 | A1 * | 4/2012 | Iguchi | H04N 1/6041 358/518 |
| 2023/0120180 | A1 * | 4/2023 | Moriwaki | H04N 1/6033 358/3.01 |

FOREIGN PATENT DOCUMENTS

| | | | |
|---|---|---|---|
| JP | 2012-119799 | A | 6/2012 |
| JP | 2021-150803 | A | 9/2021 |
| JP | 2023-061208 | A | 5/2023 |

* cited by examiner

100

IMAGE FORMING APPARATUS 2

COLORIMETER 4

N

IMAGE PROCESSING APPARATUS 1

PC 3

ΔL
Δb
Δa
COLOR GAMUT OF WIDE-AREA NEIGHBORHOOD GRAY
TARGET GRAY
UP-DATED GRAY
CORRECTION DIRECTION PREDICTED BY WIDE-AREA NEIGHBORING COLOR CHANGE PREDICTION MODEL

ΔL
Δb
Δa
COLOR GAMUT OF DETAILED NEIGHBORHOOD GRAY
WIDE-AREA CORRECTED GRAY
TARGET GRAY
UPDATED GRAY

| C | M | Y | L | a | b |
|---|---|---|---|---|---|
| 10 | 10 | 10 | 83.67 | 1.63 | 1.89 |
| 20 | 20 | 20 | 76.27 | 2.11 | 2.98 |
| 40 | 40 | 40 | 60.39 | 3.52 | 7.58 |
| 60 | 60 | 60 | 44.67 | 3.54 | 10.66 |

FIG. 11

| TARGET GRAY GRADATION VALUE | | | GRADATION VALUE AND COLOR VALUE OF WIDE-AREA NEIGHBORHOOD GRAY | | | | | |
|---|---|---|---|---|---|---|---|---|
| C | M | Y | C | M | Y | L | a | b |
| 10 | 10 | 10 | 7 | 6 | 5 | 87.34 | 1.29 | −1.68 |
| 10 | 10 | 10 | 7 | 6 | 10 | 87.00 | −0.12 | 3.86 |
| 10 | 10 | 10 | 7 | 6 | 15 | 86.87 | −1.12 | 7.94 |
| 10 | 10 | 10 | 7 | 10 | 5 | 85.08 | 4.32 | −2.44 |
| 10 | 10 | 10 | 7 | 10 | 10 | 84.88 | 3.03 | 2.52 |
| 10 | 10 | 10 | 7 | 10 | 15 | 84.83 | 2.03 | 6.85 |
| 10 | 10 | 10 | 7 | 14 | 5 | 83.64 | 6.73 | −2.97 |
| 10 | 10 | 10 | 7 | 14 | 15 | 83.14 | 4.34 | 5.95 |
| 10 | 10 | 10 | 7 | 14 | 10 | 83.13 | 5.43 | 2.84 |
| 10 | 10 | 10 | 10 | 6 | 5 | 85.93 | −0.06 | −3.31 |
| 10 | 10 | 10 | 10 | 6 | 10 | 85.76 | −1.51 | 2.74 |
| 10 | 10 | 10 | 10 | 6 | 15 | 85.54 | −2.30 | 5.51 |
| 10 | 10 | 10 | 10 | 10 | 5 | 83.97 | 2.86 | −3.82 |
| 10 | 10 | 10 | 10 | 10 | 10 | 83.67 | 1.63 | 1.89 |
| 10 | 10 | 10 | 10 | 10 | 15 | 83.55 | 0.55 | 5.20 |
| 10 | 10 | 10 | 10 | 14 | 5 | 82.32 | 5.41 | −4.80 |
| 10 | 10 | 10 | 10 | 14 | 10 | 82.25 | 3.85 | 0.97 |
| 10 | 10 | 10 | 10 | 14 | 15 | 81.94 | 2.95 | 4.18 |
| 10 | 10 | 10 | 13 | 6 | 5 | 85.02 | −1.07 | −4.22 |
| 10 | 10 | 10 | 13 | 6 | 10 | 84.93 | −2.28 | 1.10 |
| 10 | 10 | 10 | 13 | 6 | 15 | 84.87 | −3.38 | 5.24 |
| 10 | 10 | 10 | 13 | 10 | 5 | 83.02 | 1.97 | −5.35 |
| 10 | 10 | 10 | 13 | 10 | 10 | 82.63 | 0.59 | 0.00 |
| 10 | 10 | 10 | 13 | 10 | 15 | 82.84 | −0.31 | 3.84 |
| 10 | 10 | 10 | 13 | 14 | 5 | 81.25 | 4.44 | −6.19 |
| 10 | 10 | 10 | 13 | 14 | 10 | 81.42 | 2.89 | −0.27 |
| 10 | 10 | 10 | 13 | 14 | 15 | 81.32 | 2.07 | 3.06 |

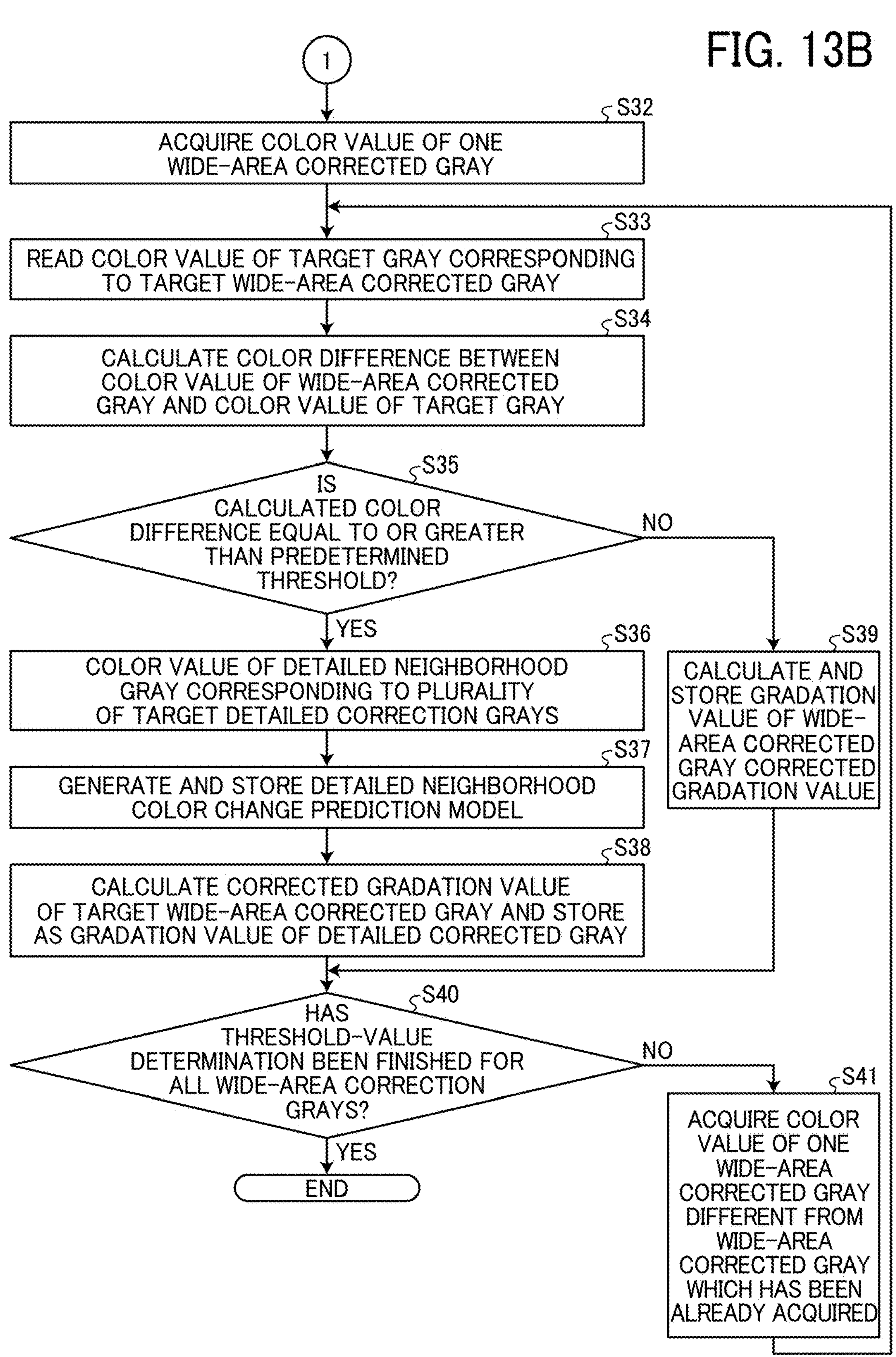
FIG. 13B
1
S32
ACQUIRE COLOR VALUE OF ONE WIDE-AREA CORRECTED GRAY
S33
READ COLOR VALUE OF TARGET GRAY CORRESPONDING TO TARGET WIDE-AREA CORRECTED GRAY
S34
CALCULATE COLOR DIFFERENCE BETWEEN COLOR VALUE OF WIDE-AREA CORRECTED GRAY AND COLOR VALUE OF TARGET GRAY
S35
IS CALCULATED COLOR DIFFERENCE EQUAL TO OR GREATER THAN PREDETERMINED THRESHOLD?
NO
YES
S36
COLOR VALUE OF DETAILED NEIGHBORHOOD GRAY CORRESPONDING TO PLURALITY OF TARGET DETAILED CORRECTION GRAYS
S37
GENERATE AND STORE DETAILED NEIGHBORHOOD COLOR CHANGE PREDICTION MODEL
S38
CALCULATE CORRECTED GRADATION VALUE OF TARGET WIDE-AREA CORRECTED GRAY AND STORE AS GRADATION VALUE OF DETAILED CORRECTED GRAY
S39
CALCULATE AND STORE GRADATION VALUE OF WIDE-AREA CORRECTED GRAY CORRECTED GRADATION VALUE
S40
HAS THRESHOLD-VALUE DETERMINATION BEEN FINISHED FOR ALL WIDE-AREA CORRECTION GRAYS?
NO
YES
END
S41
ACQUIRE COLOR VALUE OF ONE WIDE-AREA CORRECTED GRAY DIFFERENT FROM WIDE-AREA CORRECTED GRAY WHICH HAS BEEN ALREADY ACQUIRED

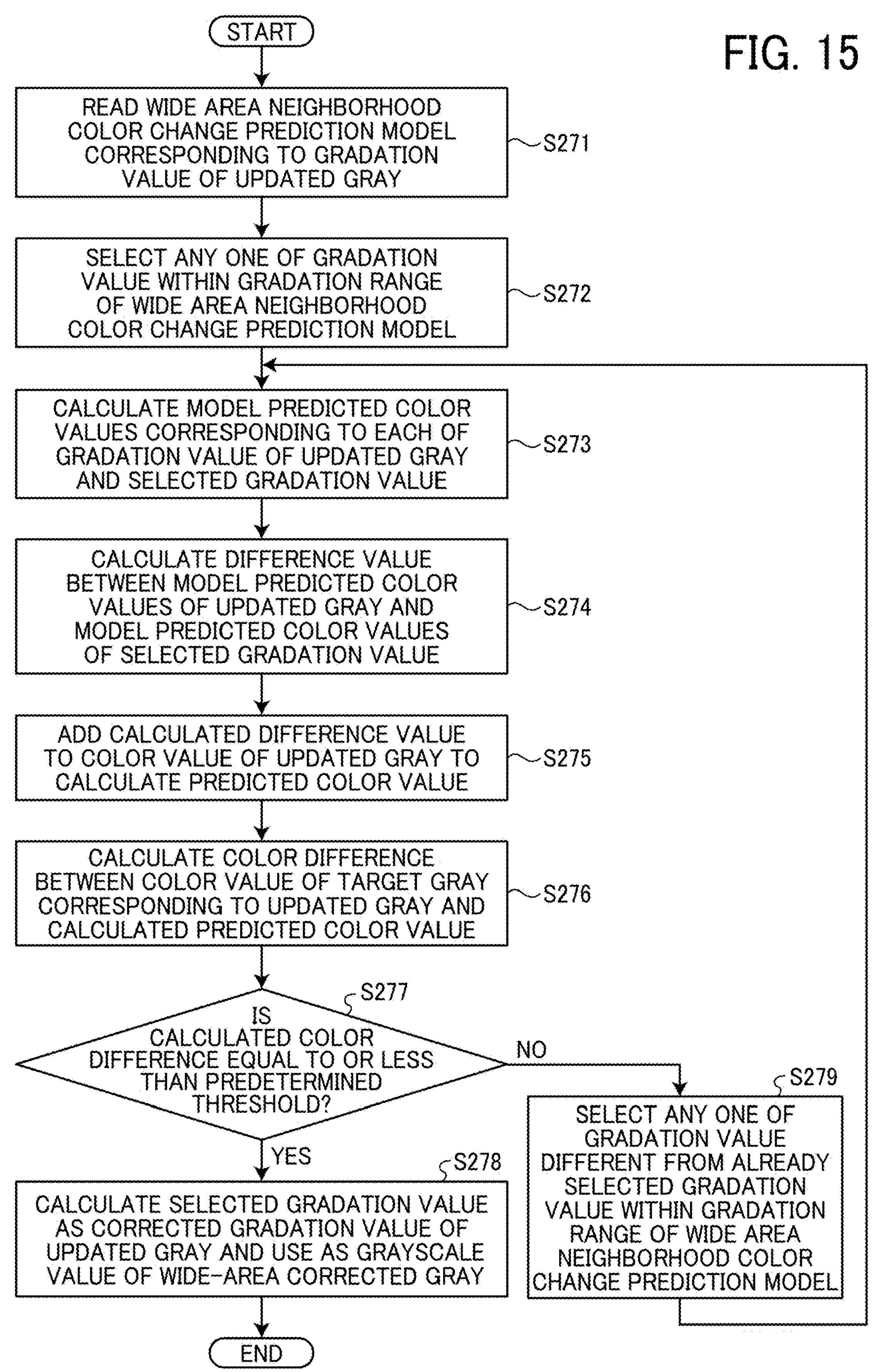
FIG. 15
START
READ WIDE AREA NEIGHBORHOOD COLOR CHANGE PREDICTION MODEL CORRESPONDING TO GRADATION VALUE OF UPDATED GRAY
S271
SELECT ANY ONE OF GRADATION VALUE WITHIN GRADATION RANGE OF WIDE AREA NEIGHBORHOOD COLOR CHANGE PREDICTION MODEL
S272
CALCULATE MODEL PREDICTED COLOR VALUES CORRESPONDING TO EACH OF GRADATION VALUE OF UPDATED GRAY AND SELECTED GRADATION VALUE
S273
CALCULATE DIFFERENCE VALUE BETWEEN MODEL PREDICTED COLOR VALUES OF UPDATED GRAY AND MODEL PREDICTED COLOR VALUES OF SELECTED GRADATION VALUE
S274
ADD CALCULATED DIFFERENCE VALUE TO COLOR VALUE OF UPDATED GRAY TO CALCULATE PREDICTED COLOR VALUE
S275
CALCULATE COLOR DIFFERENCE BETWEEN COLOR VALUE OF TARGET GRAY CORRESPONDING TO UPDATED GRAY AND CALCULATED PREDICTED COLOR VALUE
S276
S277
IS CALCULATED COLOR DIFFERENCE EQUAL TO OR LESS THAN PREDETERMINED THRESHOLD?
NO
S279
SELECT ANY ONE OF GRADATION VALUE DIFFERENT FROM ALREADY SELECTED GRADATION VALUE WITHIN GRADATION RANGE OF WIDE AREA NEIGHBORHOOD COLOR CHANGE PREDICTION MODEL
YES
S278
CALCULATE SELECTED GRADATION VALUE AS CORRECTED GRADATION VALUE OF UPDATED GRAY AND USE AS GRAYSCALE VALUE OF WIDE-AREA CORRECTED GRAY
END

FIG. 16

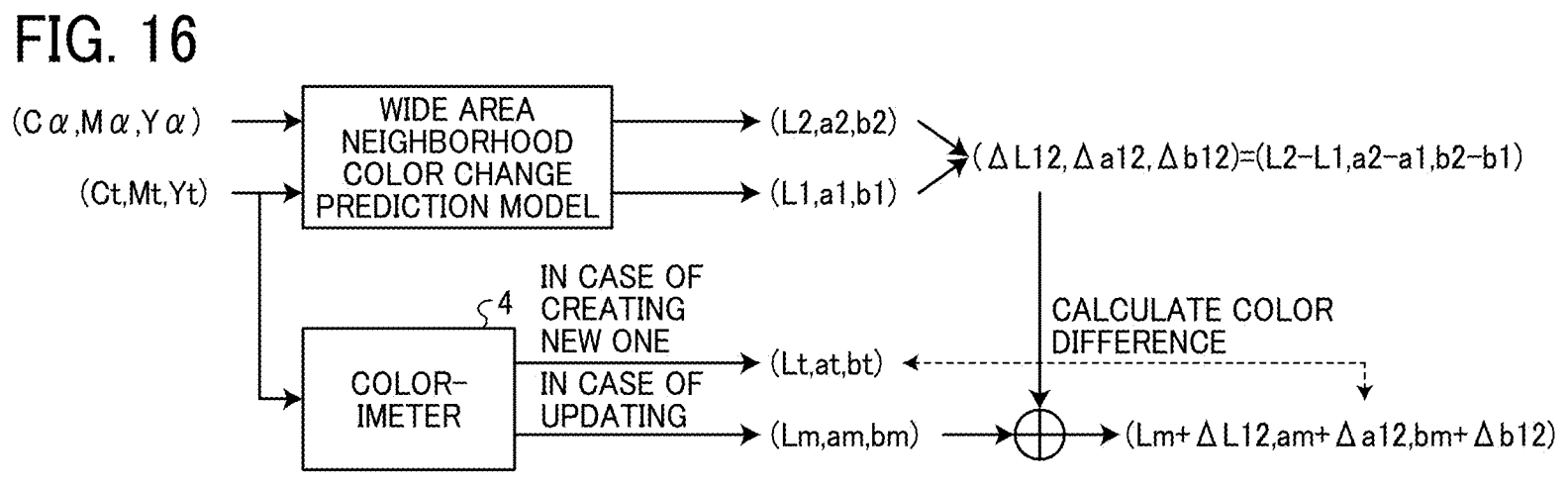

(Cα,Mα,Yα)
(Ct,Mt,Yt)
WIDE AREA NEIGHBORHOOD COLOR CHANGE PREDICTION MODEL
(L2,a2,b2)
(L1,a1,b1)
(ΔL12, Δa12, Δb12)=(L2−L1,a2−a1,b2−b1)
CALCULATE COLOR DIFFERENCE
4
COLOR-IMETER
IN CASE OF CREATING NEW ONE
IN CASE OF UPDATING
(Lt,at,bt)
(Lm,am,bm)
(Lm+ΔL12,am+Δa12,bm+Δb12)

| TARGET GRAY GRADATION VALUE | | | CORRECTED GRADATION VALUE | | |
|---|---|---|---|---|---|
| C | M | Y | C | M | Y |
| 10 | 10 | 10 | 11.67 | 12.03 | 9.88 |
| 20 | 20 | 20 | 20 | 20 | 20 |
| 40 | 40 | 40 | 42.47 | 44.35 | 40.86 |
| 60 | 60 | 60 | 64.19 | 65.98 | 61.43 |

FIG. 19

| GRADATION VALUE OF WIDE-AREA CORRECTED GRAY | | | GRADATION VALUE AND COLOR VALUE OF DETAILED NEIGHBORHOOD GRAY | | | | | |
|---|---|---|---|---|---|---|---|---|
| C | M | Y | C | M | Y | L | a | b |
| 11.67 | 12.03 | 9.88 | 9.67 | 10.03 | 4.88 | 85.24 | 2.44 | −2.38 |
| 11.67 | 12.03 | 9.88 | 9.67 | 10.03 | 14.88 | 84.93 | 0.09 | 6.84 |
| 11.67 | 12.03 | 9.88 | 9.67 | 14.03 | 4.88 | 83.83 | 4.47 | −3.03 |
| 11.67 | 12.03 | 9.88 | 9.67 | 14.03 | 14.88 | 83.45 | 2.25 | 6.51 |
| 11.67 | 12.03 | 9.88 | 11.67 | 12.03 | 9.88 | 83.62 | 1.35 | 1.79 |
| 11.67 | 12.03 | 9.88 | 13.67 | 10.03 | 4.88 | 84.03 | 0.98 | −3.60 |
| 11.67 | 12.03 | 9.88 | 13.67 | 10.03 | 14.88 | 83.59 | −1.33 | 5.16 |
| 11.67 | 12.03 | 9.88 | 13.67 | 14.03 | 4.88 | 82.59 | 3.30 | −4.24 |
| 11.67 | 12.03 | 9.88 | 13.67 | 14.03 | 14.88 | 82.53 | 1.01 | 4.26 |

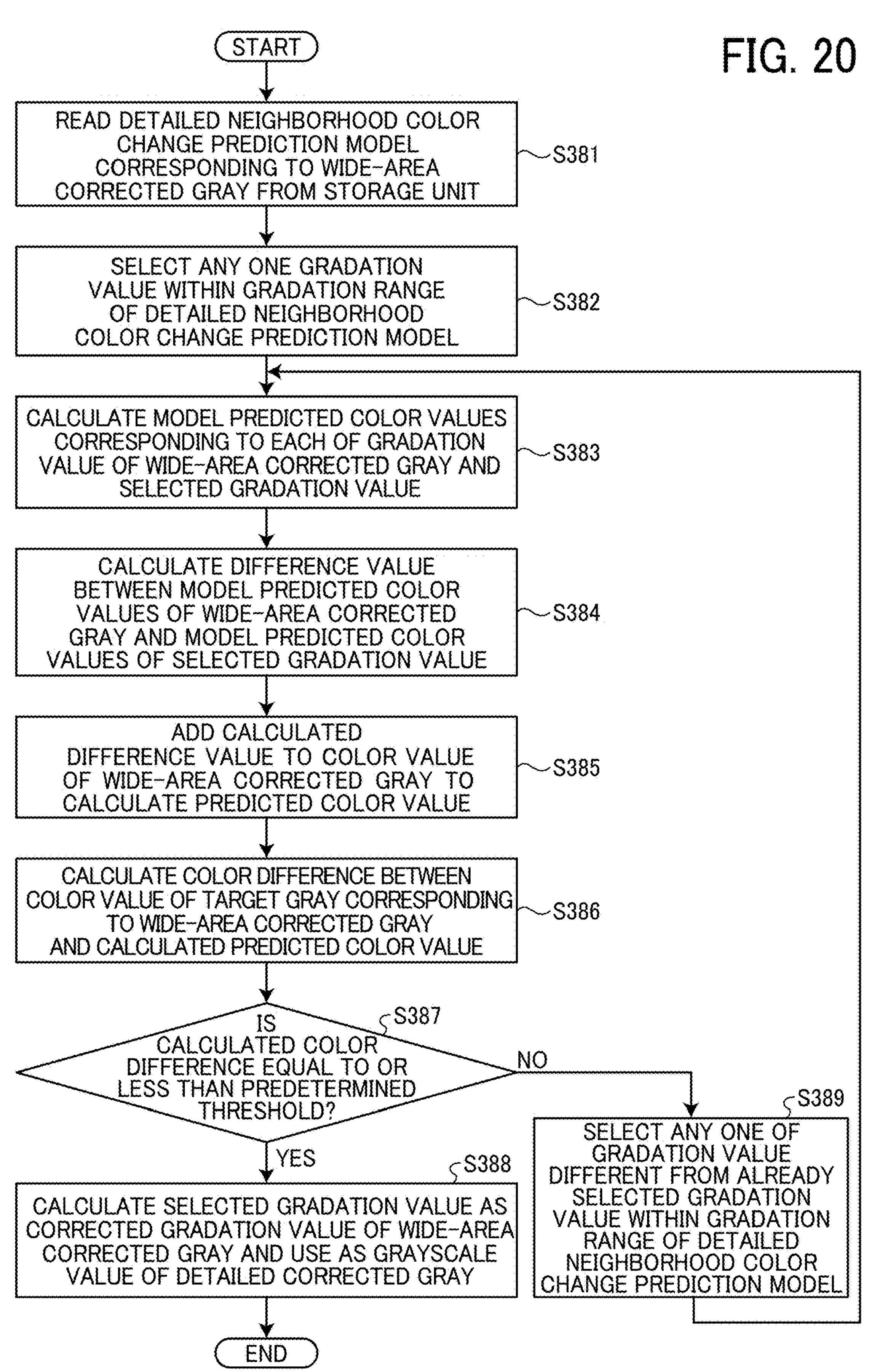
FIG. 20
START
READ DETAILED NEIGHBORHOOD COLOR CHANGE PREDICTION MODEL CORRESPONDING TO WIDE-AREA CORRECTED GRAY FROM STORAGE UNIT
S381
SELECT ANY ONE GRADATION VALUE WITHIN GRADATION RANGE OF DETAILED NEIGHBORHOOD COLOR CHANGE PREDICTION MODEL
S382
CALCULATE MODEL PREDICTED COLOR VALUES CORRESPONDING TO EACH OF GRADATION VALUE OF WIDE-AREA CORRECTED GRAY AND SELECTED GRADATION VALUE
S383
CALCULATE DIFFERENCE VALUE BETWEEN MODEL PREDICTED COLOR VALUES OF WIDE-AREA CORRECTED GRAY AND MODEL PREDICTED COLOR VALUES OF SELECTED GRADATION VALUE
S384
ADD CALCULATED DIFFERENCE VALUE TO COLOR VALUE OF WIDE-AREA CORRECTED GRAY TO CALCULATE PREDICTED COLOR VALUE
S385
CALCULATE COLOR DIFFERENCE BETWEEN COLOR VALUE OF TARGET GRAY CORRESPONDING TO WIDE-AREA CORRECTED GRAY AND CALCULATED PREDICTED COLOR VALUE
S386
IS CALCULATED COLOR DIFFERENCE EQUAL TO OR LESS THAN PREDETERMINED THRESHOLD?
S387
NO
YES
CALCULATE SELECTED GRADATION VALUE AS CORRECTED GRADATION VALUE OF WIDE-AREA CORRECTED GRAY AND USE AS GRAYSCALE VALUE OF DETAILED CORRECTED GRAY
S388
SELECT ANY ONE OF GRADATION VALUE DIFFERENT FROM ALREADY SELECTED GRADATION VALUE WITHIN GRADATION RANGE OF DETAILED NEIGHBORHOOD COLOR CHANGE PREDICTION MODEL
S389
END

| C | M | Y | L | a | b | NUMBER OF CORRECTIONS |
|---|---|---|---|---|---|---|
| 10 | 10 | 10 | 83.67 | 1.63 | 1.89 | TWO |
| 20 | 20 | 20 | 76.27 | 2.11 | 2.98 | TWO |
| 40 | 40 | 40 | 60.39 | 3.52 | 7.58 | ONE |
| 60 | 60 | 60 | 44.67 | 3.54 | 10.66 | ONE |

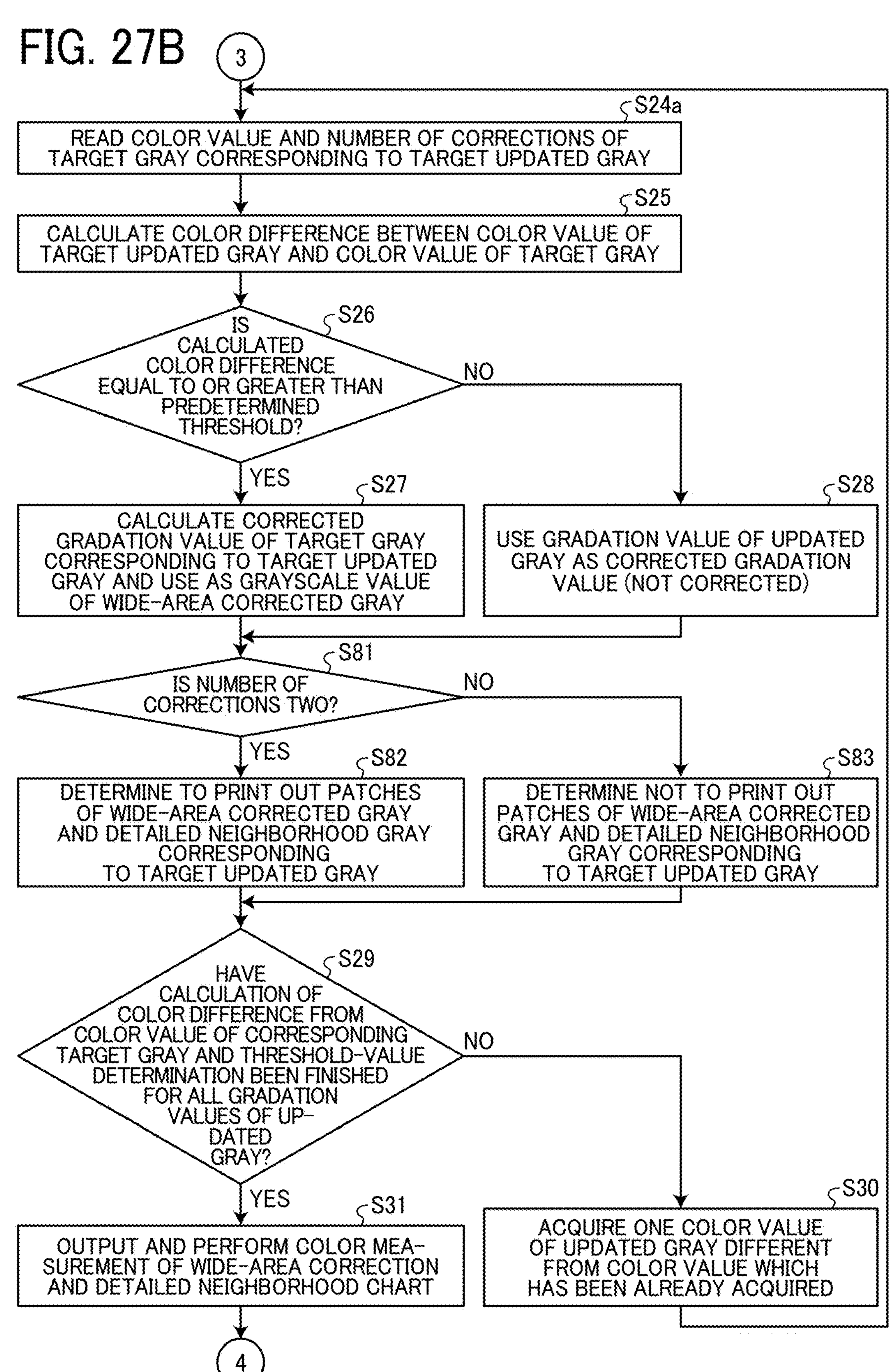
FIG. 27B
3
S24a
READ COLOR VALUE AND NUMBER OF CORRECTIONS OF TARGET GRAY CORRESPONDING TO TARGET UPDATED GRAY
S25
CALCULATE COLOR DIFFERENCE BETWEEN COLOR VALUE OF TARGET UPDATED GRAY AND COLOR VALUE OF TARGET GRAY
S26
IS CALCULATED COLOR DIFFERENCE EQUAL TO OR GREATER THAN PREDETERMINED THRESHOLD?
NO
YES
S27
CALCULATE CORRECTED GRADATION VALUE OF TARGET GRAY CORRESPONDING TO TARGET UPDATED GRAY AND USE AS GRAYSCALE VALUE OF WIDE-AREA CORRECTED GRAY
S28
USE GRADATION VALUE OF UPDATED GRAY AS CORRECTED GRADATION VALUE (NOT CORRECTED)
S81
IS NUMBER OF CORRECTIONS TWO?
NO
YES
S82
DETERMINE TO PRINT OUT PATCHES OF WIDE-AREA CORRECTED GRAY AND DETAILED NEIGHBORHOOD GRAY CORRESPONDING TO TARGET UPDATED GRAY
S83
DETERMINE NOT TO PRINT OUT PATCHES OF WIDE-AREA CORRECTED GRAY AND DETAILED NEIGHBORHOOD GRAY CORRESPONDING TO TARGET UPDATED GRAY
S29
HAVE CALCULATION OF COLOR DIFFERENCE FROM COLOR VALUE OF CORRESPONDING TARGET GRAY AND THRESHOLD-VALUE DETERMINATION BEEN FINISHED FOR ALL GRADATION VALUES OF UP-DATED GRAY?
NO
YES
S31
OUTPUT AND PERFORM COLOR MEA-SUREMENT OF WIDE-AREA CORRECTION AND DETAILED NEIGHBORHOOD CHART
S30
ACQUIRE ONE COLOR VALUE OF UPDATED GRAY DIFFERENT FROM COLOR VALUE WHICH HAS BEEN ALREADY ACQUIRED
4

IMAGE PROCESSING APPARATUS, INFORMATION PROCESSING SYSTEM, IMAGE PROCESSING METHOD, AND STORAGE MEDIUM

CROSS-REFERENCE TO RELATED APPLICATIONS

This patent application is based on and claims priority pursuant to 35 U.S.C. § 119 (a) to Japanese Patent Application No. 2023-105426, filed on Jun. 27, 2023, in the Japan Patent Office, the entire disclosure of which is hereby incorporated by reference herein.

BACKGROUND

Technical Field

The present disclosure relates to an image processing apparatus, an information processing system, an image processing method, and a storage medium.

Related Art

Since a color state of a printed material output from an image forming apparatus changes with time, color matching needs to be periodically performed. For this reason, it is necessary to appropriately perform the color matching of gray which is a mixed color of C (cyan), M (magenta), and Y (yellow). When the color matching for a change in mixed color with time, it is necessary to output neighborhood colors of a color to be matched and acquire a colorimetric value of the neighborhood colors in order to determine a color matching direction. In this case, in order to ensure the accuracy of the color matching, it is desirable to acquire the neighborhood colors as much as possible immediately before the color matching is performed. However, when acquiring neighborhood colors each time color matching is performed, a user's workload for color measurement is significant.

As a technique related to such color matching, in order to automatically and quickly perform gray balance adjustment, a gray balance adjustment method outputs neighborhood grays of a target gray to measure characteristics of mixed color at the time of correction and corrects the target gray to a target value using the result of the characteristics of mixed color.

In addition, in order to perform correction in consideration of secondary colors and tertiary colors, a calibration system searches a correction destination using a lookup table (LUT) for CMYK-L*a*b* in the international color consortium (ICC) output profile, based on a color difference between a Lab value of a correction target and a Lab value measured from a chart corresponding to the Lab value of the correction target, and applies the correction destination to an output curve of a primary color to perform correction.

SUMMARY

Embodiments of the present disclosure described herein provide a novel image processing apparatus. The image processing apparatus performs color matching of gradation values of the same target color acquired in each of two different states. The image processing apparatus includes processing circuitry. The processing circuitry acquires, in a first state, first color values of patches respectively corresponding to first gradation values and second color values of patches respectively corresponding to second gradation values. The processing circuitry acquires, in a second state, third color values of patches respectively corresponding to the first gradation values. The processing circuitry calculates a first corrected gradation value. The processing circuitry acquires, in the second state, a fourth color value of a patch corresponding to the first corrected gradation value and fifth color values of patches corresponding to third gradation values. The processing circuitry acquires calculates a second corrected gradation value.

Embodiments of the present disclosure described herein provide a novel information processing system including the image forming apparatus, a colorimeter, and the image processing apparatus. The colorimeter acquires the first color value, the second color value, the third color value, the fourth color value, and the fifth color value.

Embodiments of the present disclosure described herein provide a novel image processing method for performing color matching of gradation values of the same target color acquired in each of two different states. The method includes: acquiring, in a first state, first color values of patches respectively corresponding to first gradation values; acquiring, in the first state, second color values of patches respectively corresponding to second gradation values; acquiring, in a second state different from the first state, third color values of patches respectively corresponding to the first gradation values; calculating a first corrected gradation value based on the first gradation value; acquiring, in the second state, a fourth color value of a patch corresponding to the first corrected gradation value; acquiring, in the second state, fifth color values of patches corresponding to third gradation values; and calculating a second corrected gradation value.

Embodiments of the present disclosure described herein provide a novel non-transitory storage medium, storing computer-readable program code that, when executed by a computer, causes the computer to perform a method for performing color matching of gradation values of the same target color acquired in each of two different states. The method includes: acquiring, in a first state, first color values of patches respectively corresponding to first gradation values; acquiring, in the first state, second color values of patches respectively corresponding to second gradation values; acquiring, in a second state different from the first state, third color values of patches respectively corresponding to the first gradation values; calculating a first corrected gradation value based on the first gradation value; acquiring, in the second state, a fourth color value of a patch corresponding to the first corrected gradation value; acquiring, in the second state, fifth color values of patches corresponding to third gradation values; and calculating a second corrected gradation value.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a diagram illustrating gradation values and color values of a wide-area neighborhood gray;

FIGS. 13A and 13B are flowcharts of the gray correction processing of the image processing apparatus according to the first embodiment of the present disclosure;

FIG. 15 is a flowchart of a process of calculating gradation values of wide-area corrected gray of the image processing apparatus according to the first embodiment of the present disclosure;

FIG. 16 is a diagram illustrating calculation steps of the process of calculating gradation value of wide-area corrected gray of the image processing apparatus according to the first embodiment of the present disclosure;

FIG. 19 is a diagram illustrating gradation values and color values of a detailed neighborhood gray;

FIG. 20 is a flowchart of a process of calculating gradation values of detailed corrected gray of the image processing apparatus according to the first embodiment of the present disclosure;

FIG. 26 is a diagram illustrating gradation values, color values, and the number of corrections of a target gray; and FIGS. 27A, 27B and 27C are flowcharts of gray correction processing of the image processing apparatus according to the third embodiment of the present disclosure.

Figures 1, 2:
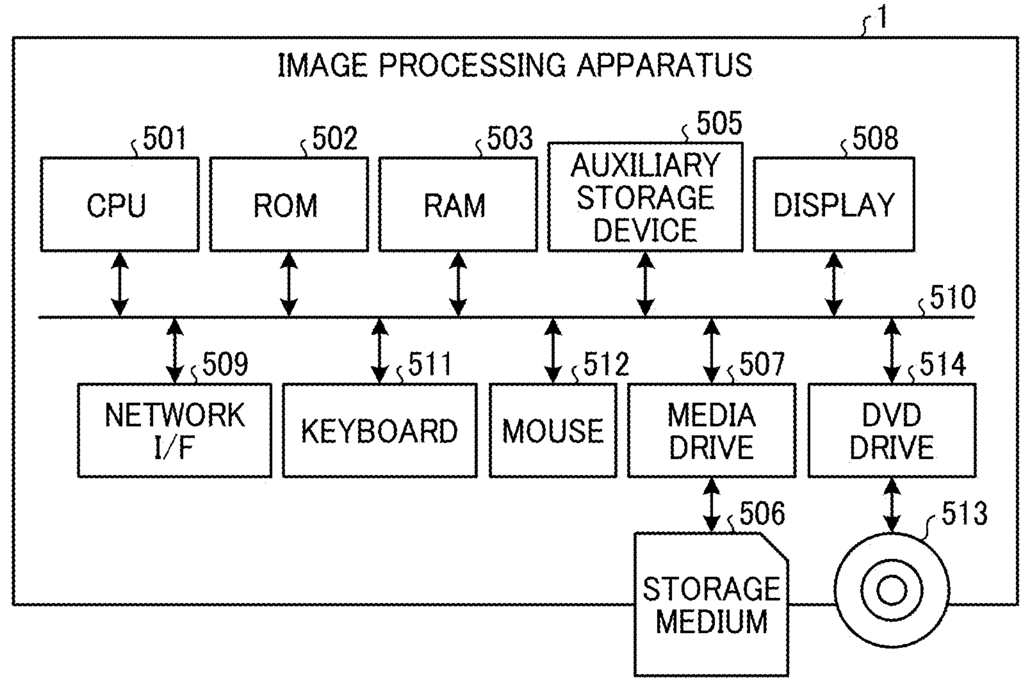
FIG. 1 is a diagram illustrating an overall configuration of an information processing system according to a first embodiment of the present disclosure.
FIG. 2 is a block diagram illustrating a hardware configuration of an image processing apparatus according to the first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

A description is given below of an image processing apparatus, an information processing system, an image processing method, and a storage medium according to embodiments of the present disclosure with reference to the drawings. The present disclosure, however, is not limited to the following one or more embodiments, and elements of the following one or more embodiments include elements that may be easily conceived by those skilled in the art, those being substantially the same ones, and those being within equivalent ranges. Furthermore, various omissions, substitutions, changes and combinations of the constituent elements can be made without departing from the gist of the following embodiments.

First Embodiment

FIG. 1 is a diagram illustrating an overall configuration of an information processing system 100 according to a first embodiment of the present disclosure. A description is given of the overall configuration of the information processing system 1 according to the present embodiment with reference to FIG. 1.

As illustrated in FIG. 1, the information processing system 100 includes an image processing apparatus 1, an image forming apparatus 2, a personal computer (PC) 3, and a colorimeter 4. Each device can perform data communication via a network N. The network N is a network configured by a local area network (LAN). The network N may be a wired network or a wireless network.

The image processing apparatus 1 is an apparatus that performs color matching (correction processing) of gray, which is a mixed color of C (cyan), M (magenta), and Y (yellow), on a printed material output by the image forming apparatus 2. The image processing apparatus 1 may be, for example, an information processing apparatus such as a regular PC. The image forming apparatus 2 may be, for example, a commercial printing machine such as a digital front end (DFE). Although gray is a mixed color of the three colors (C, M, and Y) as described above, the mixed color is not limited thereto, and may be a secondary color or another mixed color.

The image forming apparatus 2 is an apparatus that performs printing based on an image that is output from the PC 3 and is performed image processing by the image processing apparatus 1. The image forming apparatus 2 is, for example, an electrophotographic printer or a multifunction peripheral (MFP).

The PC 3 is an image processing apparatus that transmits image data to be printed to the image processing apparatus 1.

The colorimeter 4 is a device that performs colorimetry on a chart printed out by the image forming apparatus 2. The colorimeter 4 transmits color values such as Lab value in the CIELAB color space obtained by colorimetry on the chart to the image processing apparatus 1. The colorimeter 4 may be a device that automatically reads a printed material of a chart that is placed on the device. Alternatively, the colorimeter 4 may be a device that is manually operated to read a printed material of a chart. The color value measured by the colorimeter 4 is not limited to the Lab value, and may be a color value indicating another color such as a red-green-blue (RGB) value. The colorimeter 4 is illustrated as a device independent from the image forming apparatus 2, but is not limited thereto, and may be a device incorporated in the image forming apparatus 2, for example.

FIG. 2 is a block diagram illustrating a hardware configuration of the image processing apparatus 1 according to the first embodiment of the present disclosure. A description is given below of the hardware configuration of the image processing apparatus 1 according to the first embodiment of the present disclosure with reference to FIG. 2.

As illustrated in FIG. 2, the image processing apparatus 1 includes a central processing unit (CPU) 501, a read-only memory (ROM) 502, a random-access memory (RAM) 503, an auxiliary storage device 505, a media drive 507, a display 508, a network interface (I/F) 509, a keyboard 511, a mouse 512, and a digital versatile disc (DVD) drive 514.

The CPU 501 is a processor that controls an overall operation of the information processing apparatus 1. The ROM 502 is a nonvolatile storage device that stores a program such as an initial program loader (IPL) executed first by the CPU 501. The RAM 503 is a volatile storage device used as a working area of the CPU 501.

The auxiliary storage device 505 is a nonvolatile storage device that stores various data such as programs. The auxiliary storage device 505 is, for example, a hard disk drive (HDD) or a solid-state drive (SSD).

The media drive 507 controls reading or writing of data from or to a recording medium 506 such as a flash memory.

The display 508 is a liquid crystal display (LCD) or an organic electro-luminescence (EL) display that displays various types of information such as a cursor, a menu, a window, characters, or an image.

The network I/F 509 is an interface for performing data communication using the network N. The network I/F 509 is, for example, a network interface card (NIC) that enables communication using a transmission control protocol (TCP)/internet protocol (IP address). The network I/F 509 may be a communication interface having a wireless communication function based on a standard such as Wi-Fi®.

The keyboard 511 is an input device including a plurality of keys for inputting characters, numerical values, or various instructions. The mouse 512 is an example of an input device to select a specific instruction or execution, select a target for processing, or move a cursor being displayed.

The DVD drive 514 is a device that controls reading or writing of various types of information from and to a DVD 513 as an example of a removable recording medium. The DVD 513 is, for example, a digital versatile disk rewritable (DVD-RW), a digital versatile disk recordable (DVD-R), a compact disc rewritable (CD-RW), or a compact disc recordable (CD-R).

The CPU 501, the ROM 502, the RAM 503, the auxiliary storage device 505, the media drive 507, the display 508, the network I/F 509, the keyboard 511, the mouse 512, and the DVD drive 514 are connected to each other to communicate with each other via a bus line 510 such as an address bus or a data bus.

Figure 3:
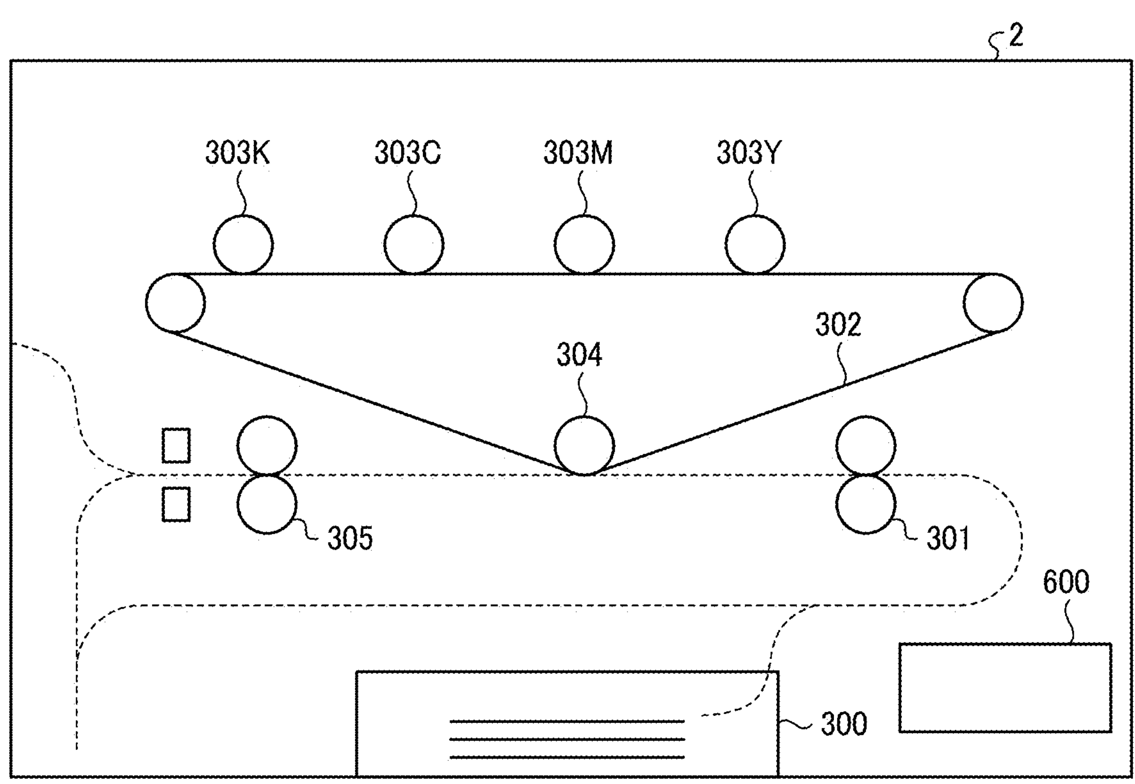
FIG. 3 is a diagram illustrating an outline of a structure of an image forming apparatus according to the first embodiment of the present disclosure.

The hardware configuration of the image processing apparatus 1 illustrated in FIG. 2 is an example. The image processing apparatus 1 may not include each unit or device described above and may include other units or devices. The hardware configuration of the PC 3 is also the same or substantially the same hardware configuration as illustrated in FIG. 2. FIG. 3 is a diagram illustrating an outline of a structure of the image forming apparatus 2 according to the first embodiment of the present disclosure. A description is given below of the outline of a structure of the image forming apparatus 2 according to the first embodiment of the present disclosure with reference to FIG. 3.

The image forming apparatus 2 illustrated in FIG. 3 is a printing apparatus such as a tandem-type MFP. As illustrated in FIG. 3, the image forming apparatus 2 includes a sheet feeding tray 300, a conveyance roller 301, an intermediate transfer belt 302, photoconductor drums 303C, 303M, 303Y, and 303K, a transfer roller 304, a fixing roller 305, and a controller 600.

The sheet feeding tray 300 is a tray in which recording media such as sheets of paper to be fed are stored.

The conveyance roller 301 is a pair of rollers that conveys the recording medium fed from the sheet feeding tray 300 to the transfer roller 304 along a conveyance passage.

The intermediate transfer belt 302 is an endless belt on which an intermediate transfer image is formed by the photoconductor drums 303C, 303M, 303Y, and 303K. The intermediate transfer belt 302 rotates clockwise in the paper surface view of FIG. 3, and toner images of the respective colors are formed in the order of the photoconductor drums 303K, 303C, 303M, and 303Y.

The photoconductor drum 303C is a photoconductor drum that forms a toner image of a cyan color on the intermediate transfer belt 302. The photoconductor drum 303M is a photoconductor drum that forms a toner image of a magenta color on the intermediate transfer belt 302. The photoconductor drum 303Y is a photoconductor drum that forms a toner image of a yellow color on the intermediate transfer belt 302. The photoconductor drum 303K is a photoconductor drum that forms a toner image of a black color on the intermediate transfer belt 302. In order to form an intermediate transfer image on the intermediate transfer belt 302, the photoconductor drums 303K, 303C, 303M, and 303Y are aligned along the intermediate transfer belt 302, sequentially from upstream in the rotation direction of the intermediate transfer belt 302. Accordingly, toner images of the respective colors are formed on the surface of the intermediate transfer belt 302, and a full-color image is formed as the intermediate transfer image. The photoconductor drums 303C, 303M, 303Y, and 303K are simply referred to as "photoconductor drum 303" or "photoconductor drums 303" when any photoconductor drum 303 is indicated or collectively referred to. The photoconductor drums 303 are configured to use CMYK colors as process colors. However, the photoconductor drums 303 may use CMY colors as process colors, or may use red (R), blue (B), and green (G) as process colors instead of CMY colors.

The transfer roller 304 is a roller that transfers the intermediate transfer image (full-color image) formed on the intermediate transfer belt 302 onto the recording medium conveyed by the conveyance roller 301. The transfer roller 304 functions to form (print) a full-color image on the recording medium.

The fixing roller 305 is a pair of rollers that fixes an image to the recording medium on which the full-color image is formed.

The controller 600 is a control device that controls an overall operation of the image forming apparatus 2. Details of the hardware configuration of the controller 600 are described later with reference to FIG. 4.

Figure 4:
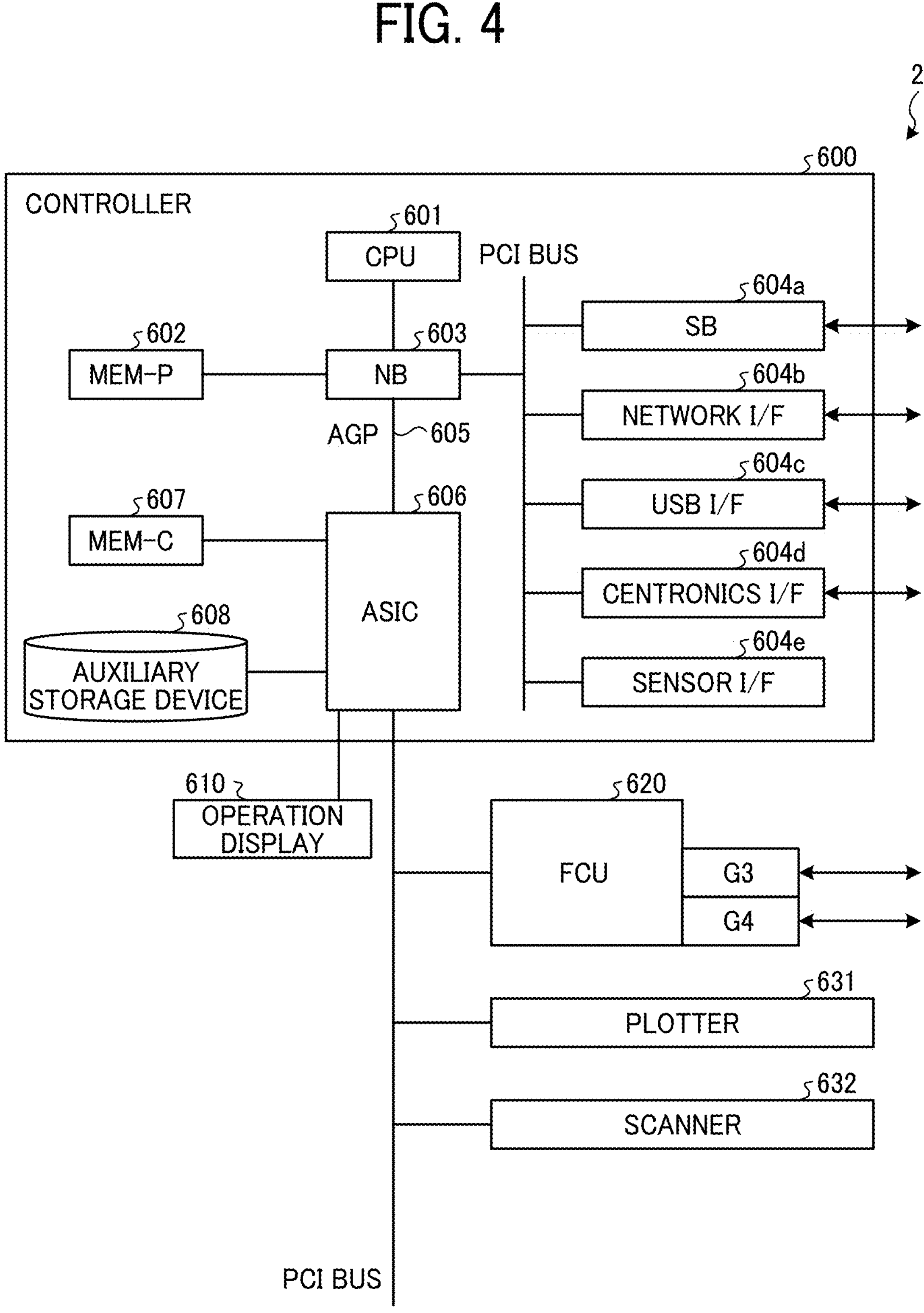
FIG. 4 is a block diagram illustrating a hardware configuration of the image forming apparatus according to the first embodiment of the present disclosure.

FIG. 4 is a block diagram illustrating a hardware configuration of the image forming apparatus 2 according to the first embodiment of the present disclosure. A description is given of the hardware configuration of the image forming apparatus 2 with reference to FIG. 4.

As illustrated in FIG. 4, the image forming apparatus 2 includes the controller 600, an operation display 610, a facsimile control unit (FCU) 620, a plotter 631, and a scanner 632 connected with each other via a peripheral component interconnect (PCI) bus.

The controller 600 is a device that controls the overall operation of the image forming apparatus 2, and controls drawing, communication, and input from the operation display 610.

The operation display 610 is, for example, a touch screen, and is a device that receives an input to the controller 600 (input function) and displays the state of the image forming apparatus 2 (display function). The operation display 610 is directly connected to an application specific integrated circuit (ASIC) 606 described later.

The FCU 620 is a device that implements a facsimile function, and is connected to the ASIC 606 via, for example, the PCI bus.

The plotter 631 is a device that implements a printing function. The plotter 631 is connected to the ASIC 606 via, for example, the PCI bus. The plotter 631 corresponds to the intermediate transfer belt 302, the photoconductor drums 303, and the transfer roller 304 illustrated in FIG. 3.

The scanner 632 is a device that implements a scanner function, and is connected to the ASIC 606 via, for example, the PCI bus.

As illustrated in FIG. 4, the controller 600 includes a CPU 601, a system memory (MEM-P) 602, a northbridge (NB) 603, a southbridge (SB) 604*a*, a network I/F 604*b*, a universal serial bus (USB) I/F 604*c*, a Centronics I/F 604*d*, a sensor I/F 604*e*, the ASIC 606, a local memory (MEM-C) 607, and an auxiliary storage device 608.

The CPU 601 is a processor that controls the overall operation of the image forming apparatus 2. The CPU 601 is connected to a chipset including the system memory 602, the north bridge 603, and the south bridge 604*a*, and is connected to other devices via the chipset.

The system memory 602 is used as a memory for storing programs and data, a memory for expanding programs and data, and a memory for drawing for a printer, and includes a ROM and a RAM. The ROM of the system memory 602 is for storing programs and data. The RAM of the system memory 602 is a writable and readable memory for loading programs and data, and storing drawing data of the printer.

The north bridge 603 is a bridge for connecting the CPU 601 to the system memory 602, the south bridge 604*a*, and an accelerated graphics port (AGP) bus 605. The north bridge 603 includes a memory controller, a PCI master, and an AGP target. The memory controller controls reading and writing from and to the system memory 602.

The south bridge 604*a* connects the north bridge 603 with PCI devices and peripheral devices. The south bridge 604*a* is connected to the north bridge 603 via the PCI bus. The network I/F 604*b*, the USB I/F 604*c*, the Centronics I/F 604*d*, and the sensor I/F 604*e* are connected to the PCI bus.

The AGP bus 605 is a bus interface for graphics accelerator cards to accelerate graphics processing. The AGP bus 605 can speed up the graphics accelerator cards by directly accessing the system memory 602 with high throughput.

The ASIC 606 is an integrated circuit (IC) for image processing applications having hardware elements for image processing. The ASIC 606 serves as a bridge that connects the AGP bus 605, the PCI bus, the auxiliary storage device 608, and the local memory 607 with each other. The ASIC 606 includes a PCI target, an AGP master, an arbiter (ARB) as a central processing unit of the ASIC 606, a memory controller for controlling the local memory 607, a plurality of direct memory access controllers (DMACs) capable of rotating image data with a hardware logic, and a PCI unit that transfers data between the plotter 631 and the scanner 632 via the PCI bus. For example, the FCU 620, the plotter 631, and the scanner 632 are connected to the ASIC 606 via the PCI bus.

The local memory 607 is used as a copy image buffer and a code buffer.

The auxiliary storage device 608 is a storage area such as a HDD, a SSD, a secure digital (SD) card, or flash memory, and stores image data, programs, font data, and forms.

The hardware configuration of the image forming apparatus 2 illustrated in FIG. 3 is an example. The image forming apparatus 2 may not include each unit or device described above and may include other units or devices. For example, the image forming apparatus 2 may include an automatic document feeder (ADF).

Figure 5:
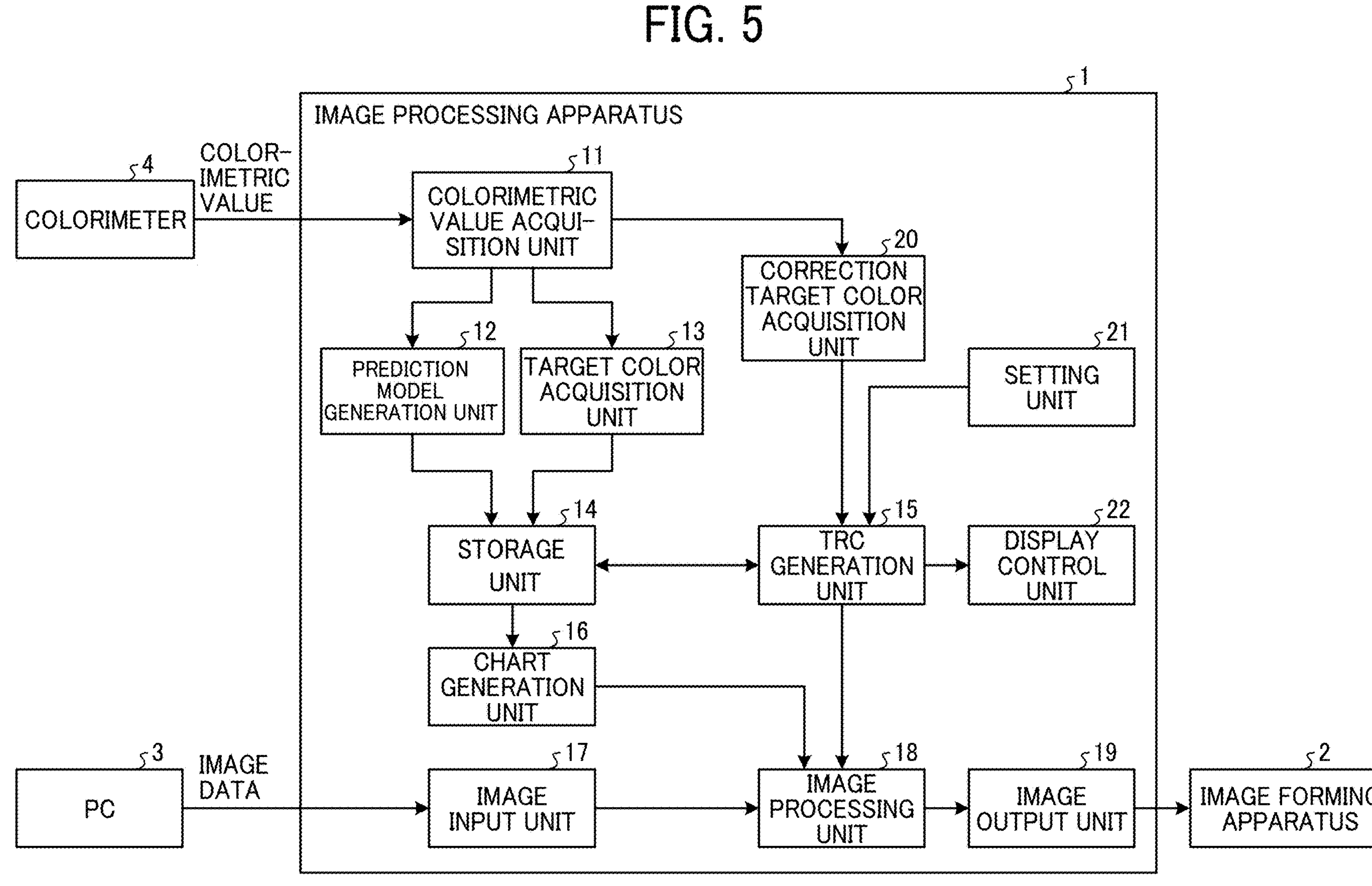
FIG. 5 is a diagram illustrating a configuration of functional blocks of the image processing apparatus according to the first embodiment of the present disclosure.

FIG. 5 is a diagram illustrating a configuration of functional blocks of the image processing apparatus 1 according to the first embodiment of the present disclosure. A description is given below of the configuration of the functional blocks of the image processing apparatus 1 according to the first embodiment of the present disclosure with reference to FIG. 5.

As illustrated in FIG. 5, the image processing apparatus 1 includes a colorimetric value acquisition unit 11, a prediction model generation unit 12 (an example of a second acquisition unit and an example of a generation unit), a target color acquisition unit 13 (an example of a first acquisition unit), a storage unit 14, a correction target color acquisition unit 20 (an example of a third acquisition unit), a tone reproduction curve (TRC) generation unit 15 (an example of a calculation unit and an example of a determination unit), a chart generation unit 16, an image input unit 17, an image processing unit 18, an image output unit 19, a setting unit 21, and a display control unit 22.

The colorimetric value acquisition unit 11 is a functional unit that acquires color values (colorimetric values) acquired by the colorimeter 4 measuring the color of a chart printed by the image forming apparatus 2, via the network I/F 509. The colorimetric value acquisition unit 11 is implemented, for example, by executing a program by the CPU 501 illustrated in FIG. 2.

The prediction model generation unit 12 is a functional unit that generates a color change prediction model for predicting a color value from a color gradation value (CMY value) based on the color values acquired by the colorimetric value acquisition unit 11. The prediction model generation unit 12 generates, for example, a model for converting a gradation value into a color value by a matrix or a polynomial as the color change prediction model. The prediction model generation unit 12 may generate a color change prediction model as a learning model by learning processing based on supervised learning. The prediction model generation unit 12 generates a color change prediction model for each gradation value of target gray described later and stores the color change prediction model in the storage unit 14. The prediction model generation unit 12 is implemented, for example, by executing a program by the CPU 501 illustrated in FIG. 2.

The target color acquisition unit 13 is a functional unit that acquires color values of target colors (target single colors) of the respective single colors of CMY and a target color (target gray or target mixed color) of gray that is a mixed color from the color values acquired by the colorimetric value acquisition unit 11. The target color acquisition unit 13 stores the acquired color values of the target single colors and the target gray in the storage unit 14. The target color acquisition unit 13 is implemented, for example, by executing a program by the CPU 501 illustrated in FIG. 2.

The storage unit 14 is a functional unit that stores a color change prediction model and various TRCs. The storage unit 14 is implemented by the RAM 503 or the auxiliary storage device 505 illustrated in FIG. 2.

The correction target color acquisition unit 20 is a functional unit that acquires color values of patches corresponding to updated gray described later and wide-area corrected gray from the color values measured from the chart by the colorimetric value acquisition unit 11. The correction target color acquisition unit 20 is implemented, for example, by executing a program by the CPU 501 illustrated in FIG. 2.

The TRC generation unit 15 is a functional unit that generates a single-color TRC based on the color values of the target single colors acquired by the target color acquisition unit 13 and the gradation values of the target single colors stored in the storage unit 14. The TRC generation unit 15 generates a gray-corrected single-color TRC based on the gradation values of the target single colors stored in the storage unit 14, the color values of the updated gray and the wide-area corrected gray acquired by the correction target color acquiring unit 20, the gradation value of the detailed corrected gray calculated as described later, and the color change prediction model. The single-color TRC and the gray-corrected single-color TRC are described later. The single-color TRC is a one-dimensional conversion curve for converting an input gradation value into an output gradation value as described later. The TRC generation unit 15 is implemented, for example, by executing a program by the CPU 501 illustrated in FIG. 2.

The chart generation unit 16 is a functional unit that generates a chart image necessary for acquiring the color value of the target gray, generating the color change prediction model, and performing the gray correction processing. The chart generation unit 16 is implemented, for example, by executing a program by the CPU 501 illustrated in FIG. 2.

The image input unit 17 is a functional unit that inputs image data transmitted from the PC 3 via the network I/F 509. The image input unit 17 is implemented, for example, by executing a program by the CPU 501 illustrated in FIG. 2.

The image processing unit 18 is a functional unit that converts the image data input by the image input unit 17 and the gradation values in the chart image generated by the chart generation unit 16 into gradation values in a format for printing out by the image forming apparatus 2 using the single-color TRC and the gray-corrected single-color TRC. The image processing unit 18 is implemented, for example, by executing a program by the CPU 501 illustrated in FIG. 2.

The image output unit 19 is a functional unit that outputs the image data processed by the image processing unit 18 to the image forming apparatus 2 via the network I/F 509 to cause the image forming apparatus 2 to print out the image data. The image output unit 19 is implemented, for example, by executing a program by the CPU 501 illustrated in FIG. 2.

The setting unit 21 is a functional unit that performs various settings in response to an operation input from the keyboard 511 and the mouse 512. The setting unit 21 stores set setting information in the storage unit 14. The setting unit 21 is implemented, for example, by executing a program by the CPU 501 illustrated in FIG. 2.

The display control unit 22 is a functional unit that controls a display operation of the display 508. The display control unit 22 causes the display 508 to display, for example, the correction contents generated in the process of generating the single-color TRC and the gray-corrected single-color TRC generated by the TRC generation unit 15. The display control unit 22 is implemented, for example, by executing a program by the CPU 501 illustrated in FIG. 2.

The colorimetric value acquisition unit 11, the prediction model generation unit 12, the target color acquisition unit 13, the correction target color acquisition unit 20, the TRC generation unit 15, the chart generation unit 16, the image input unit 17, the image processing unit 18, the image output unit 19, the setting unit 21, and the display control unit 22 of the image processing apparatus 1 illustrated in FIG. 5 are not limited to being implemented by the execution of a program by the CPU 501 illustrated in FIG. 2. For example, those functional units described above may be implemented by hardware such as an integrated circuit, or may be implemented by a combination of software and hardware.

The functional units of the image processing apparatus 1 illustrated in FIG. 5 conceptually represent functions and not limited to those illustrated in FIG. 5. For example, a plurality of functional units illustrated as independent functional units in the image processing apparatus 1 illustrated in FIG. 5 may be configured as one functional unit. On the other hand, in the image processing apparatus 1 illustrated in FIG. 5, the functions of one functional unit may be divided into a plurality of functional units.

Figures 6A, 6B:
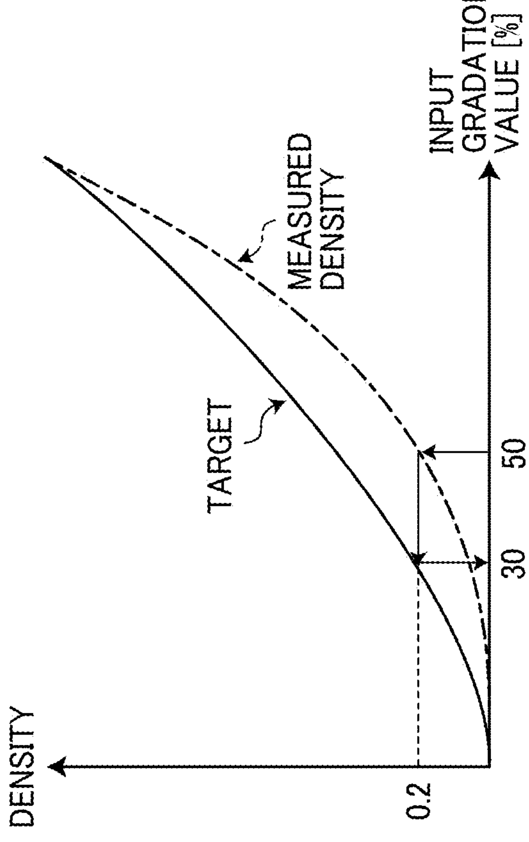
FIGS. 6A and 6B are diagrams illustrating an operation of generating a single-color tone reproduction curve (TRC) of the image processing apparatus according to the first embodiment of the present disclosure.

FIGS. 6A and 6B are diagrams illustrating an operation of generating the single-color TRC of the image processing apparatus 1 according to the first embodiment of the present disclosure. A description is given below of the operation of generating the single-color TRC performed by the image processing apparatus 1 according to the present embodiment with reference to FIG. 6.

In image processing using an electrophotographic method that is generally used, the correction of gradation values of respective single colors of C, M, Y, and K (single color calibration) is performed. In FIGS. 6A and 6B, a flow of generating a single-color TRC in single-color calibration is illustrated. The single-color TRC is generated at the time of new generation of the single-color TRC and at the time of update the single-color TRC. When a new single-color TRC is generated (an example of a first state), the image forming apparatus 2 prints a chart including patches whose gradation values are modulated in stages from 0% to 100% for each of the single colors C, M, and Y. The image processing apparatus 1 generates a density target for each input gradation value from the measured density of the patches as illustrated in FIG. 6A. Then, the image processing apparatus 1 generates the single-color TRC for converting the input gradation value to an output gradation value to match the density target as illustrated in FIG. 6B.

However, when the image forming apparatus 2 actually performs printing using the target gradation values illustrated in FIG. 6A with the passage of time or a change in environment, the density is measured on the curve of "measured density" illustrated in FIG. 6A without being on the curve of the density target, and deviates from the curve of the density target. For example, as illustrated in FIG. 6A, according to the curve of the density target, it is ideal that the density is measured as 0.2 when a patch is printed with a gradation value of 30% for a certain single color. However, in practice, the density is not measured as 0.2 unless a patch is printed with a gradation value of 50%. In this case, the image processing apparatus 1 generates the single-color TRC that converts the specified gradation value of 30% (input gradation value) into a gradation value of 50% (output gradation value), as illustrated in FIG. 6B. As a result, the specified gradation value of 30% (input gradation value) is converted into the gradation value of 50% by the single-color TRC, and the patch is printed using the gradation value of 50%. Thus, the density of the patch can be measured as 0.2. In the description below, when the image forming apparatus 2 prints general image data, the single-color TRC is applied to perform single-color management.

Similarly, when the single-color TRC is updated (an example of a second state), the image forming apparatus 2 prints a chart, and the image processing apparatus 1 updates the single-color TRC so that the density measured for the patches matches the density target generated at the time of new generation of the single-color TRC. Thus, the target density for each single color generated at the time of new generation of the single-color TRC is reproduced at the time of update of the single-color TRC.

However, although the color reproducibility of a single color with respect to the passage of time or the change in environment is guaranteed by the single-color calibration, the color reproducibility of a mixed color obtained by superimposing single colors with respect to the passage of time or the change in environment is not guaranteed even when the single-color calibration is performed. For this reason, it is necessary to perform not only the single-color calibration but also correction of mixed color in which C, M, Y, and K are combined. In particular, since the gray mixed with C, M, and Y is a color that is often used and is a color that appears to be greatly different to the human eye even with a minute change, gray correction specialized for gray may be performed. Although the gray correction is described below in the present embodiment, the gray correction can be similarly applied to a secondary color or a mixed color including K.

Figures 7A, 7B:
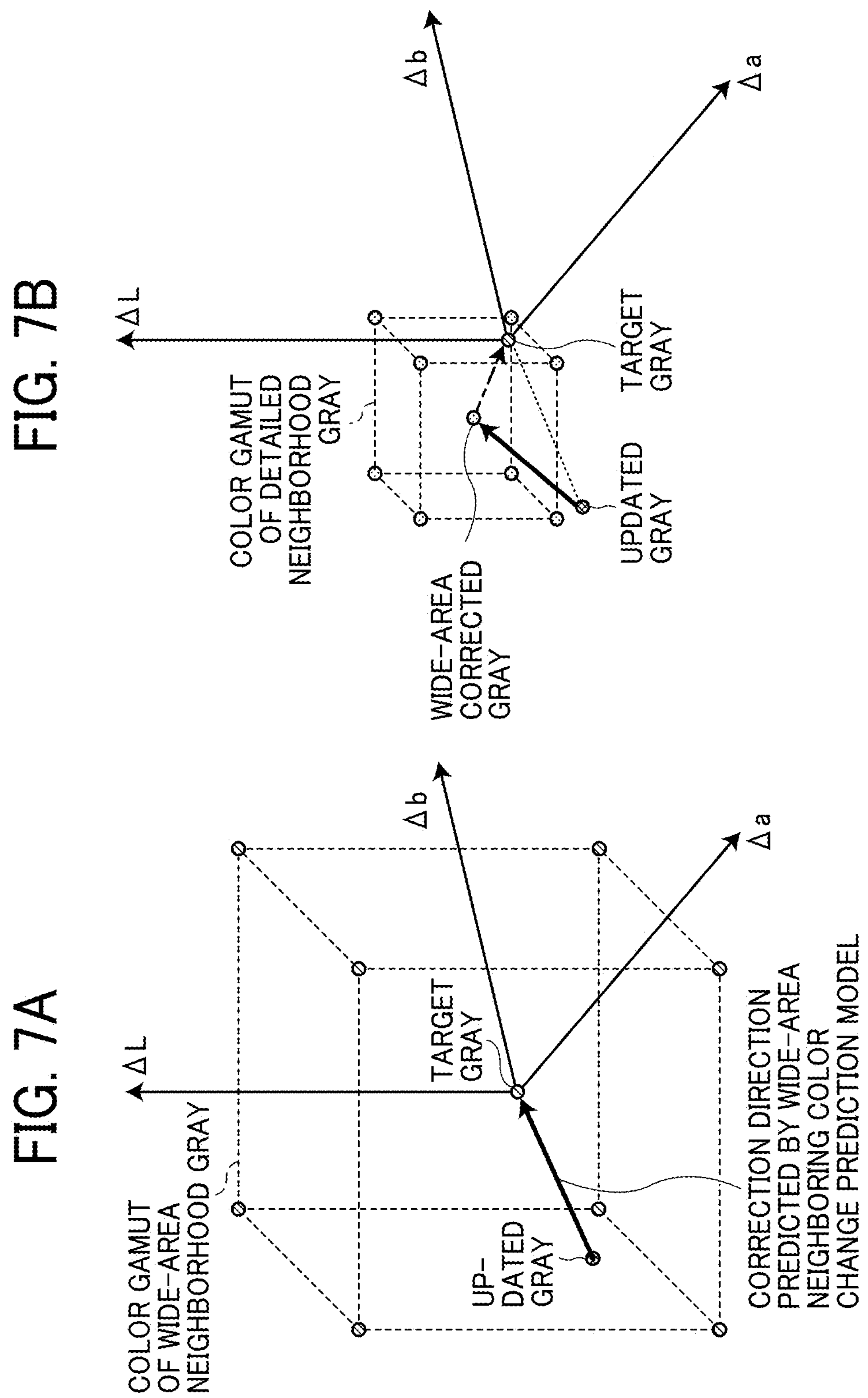
FIGS. 7A and 7B are diagrams illustrating an outline of gray correction processing of the image processing apparatus according to the first embodiment of the present disclosure.

FIGS. 7A and 7B are diagrams illustrating an outline of the gray correction processing of the image processing apparatus 1 according to the first embodiment of the present disclosure. A description is given below of the outline of the gray correction processing of the image processing apparatus 1 according to the present embodiment with reference to FIG. 7.

Since the toner constituting the target color is one color, the single-color calibration can be implemented by simple correction. However, since the toner constituting the target color is three colors, the gray correction needs to correct three colors at the same time. A method is generally used in which patches of gray acquired by slightly changing the combination of C, M, and Y with respect to the gray to be corrected, in other words, patches of neighborhood gray for the gray to be corrected are printed by an image forming apparatus, the measured color values of the printed patches are acquired to predict the color change when C, M, and Y are changed, and then the color that matches the target color is determined. In this case, the range of the color gamut formed by the neighborhood gray to be printed needs to include a color obtained when the target color changes in color due to the passage of time or the change in environment, and it is necessary to print the neighborhood gray over a wide color gamut to ensure that the color whose target color has changed is included regardless of any of passage of time or the change in environment. Since it is not practical to print all neighborhood grays in the color gamut, the color values of the neighborhood gray which have not been printed are predicted by interpolation from the measured color values of the printed neighborhood gray. Since a prediction error due to the interpolation affects the accuracy of the correction, it is necessary to provide several kinds of combinations of C, M, and Y constituting the neighborhood gray to be printed in order to increase the accuracy of the correction. However, as the color gamut of the neighborhood gray to be printed is wider, sufficient accuracy of a prediction cannot be maintained unless the kinds of combinations of C, M, and Y are increased. As a result, many patches of neighborhood gray need to be printed.

Considering that the color change when C, M, and Y are changed changes with time, it is desirable that the printing of the patches of the neighborhood gray is performed simultaneously with the correction. However, when not only the gray to be corrected but also the neighborhood gray is printed every time the correction is performed and the user performs colorimetry using an external colorimeter, the user needs to preform colorimetry on a large number of patches, and the user's workload increases. When the color values are acquired using a reading device such as a scanner incorporated in the image forming apparatus instead of the external colorimeter, the user does not need to perform colorimetry. However, even in this case, since a large number of patches are printed, which leads to a large amount of sheet of paper consumption, it is not preferable. In the present embodiment, the image processing apparatus 1 is described which can perform gray correction with high accuracy without forcing the user to preform colorimetry on a large number of patches and can provide a printing environment with high color reproducibility with respect to the passage of time or the change in environment in gray.

FIGS. 7A and 7B are diagrams illustrating the outline of the gray correction processing of the image processing apparatus 1 of the present embodiment. The image processing apparatus 1 generates a single-color TRC (new generation of a single-color TRC) by the single-color calibration as described above. Patches of gray mixed with colors of C, M, and Y to which the single-color TRC is applied are printed out and the colors of the patches are measured. The measured color is set as target gray. The image processing apparatus 1 also simultaneously performs printing and colorimetry on the patches of neighborhood gray (referred to as "wide-area neighborhood gray") with respect to the target gray, and generates a wide-area neighborhood color change prediction model together with the target gray. The wide-area neighborhood gray to be printed out is gray included in a range in which the respective gradations are largely changed with the respective gradation values of C, M, and Y constituting the target gray as centers, and has a wide color gamut as illustrated in FIG. 7A. The color gamut range of the gradation values corresponding to the color gamut illustrated in FIG. 7A corresponds to the "first color gamut range" of the present disclosure. The reason why the color gamut is wide is that, in order to accurately preform correction, gray (referred to as updated gray) changed from the target gray due to the influence of the passage of time or the change in environment needs to be included in the color gamut of the wide-area neighborhood gray regardless of the color value, and the maximum change of color variation that can occur due to the passage of time or the change in environment needs to be secured as the color gamut.

After that, the image processing apparatus 1 performs the update process of the single-color TRC, and then performs printing and colorimetry on the patches of the updated gray having the same gradation value as the target gray, and determines whether to perform the correction of the updated gray to bring it closer to the target gray. When the image processing apparatus 1 determines to perform the correction, the image processing apparatus 1 calculates corrected gradation values using the wide-area neighborhood color change prediction model to obtain the color value that matches the target gray. Then, the image processing apparatus 1 performs printing and colorimetry on the patches of corrected gray (referred to as wide-area corrected gray) acquired by printing out the corrected gradation values and the patches of neighborhood gray (referred to as detailed neighborhood gray) of the corrected gray, and generate a detailed neighborhood color change prediction model using the measured color values. The detailed neighborhood gray to be printed out is gray acquired by changing the respective gradations around the gradation values of C, M, and Y constituting the wide-area corrected gray dynamically changed from the target gray with respect to the color value in a range smaller than the range of the color gamut of the wide-area neighborhood gray, and has a color gamut smaller than the wide-area neighborhood gray. The color gamut range of the gradation values corresponding to the color gamut illustrated in FIG. 7B corresponds to the "second color gamut range" of the present disclosure. Then, the image processing apparatus 1 determines whether the wide-area corrected gray is sufficiently close to the target gray. When the image processing apparatus 1 determines that the wide-area corrected gray is not sufficiently close to the target gray, the image processing apparatus 1 calculates corrected gradation values that match the color value of the target gray using the detailed neighborhood color change prediction model. The corrected gray acquired by printing out the corrected gradation values may be referred to as detailed corrected gray.

As illustrated in FIG. 7B, the reason why the wide-area corrected gray is not sufficiently close to the target gray is that the wide-area neighborhood color change prediction model used to predict the corrected gradation values is generated based on the color values at the time of new generation. In other words, the corrected gradation values are calculated based on the past information, and accordingly, there is a possibility that the corrected gradation values are affected by the passage of time or the change in environment. In order to obtain a sufficient accuracy of the correction, since first correction using the wide-area neighborhood color change prediction model generated at the time of new generation in the past may be insufficient, the image processing apparatus 1 newly generates a detailed neighborhood color change prediction model at the present of update and performs a second correction. On the other hand, since the first correction has been performed, it is assumed that the wide-area corrected gray is obviously closer to the target gray than the updated gray, and thus even if the detailed neighborhood gray is defined in a narrow color gamut, the detailed neighborhood gray can sufficiently include the target gray. In other words, even in a case where the combination of the gradation values of C, M, and Y of the detailed neighborhood gray to be printed out is used when the image processing apparatus 1 executes the gray correction processing, the accuracy of prediction can be sufficiently maintained. As a result, it is not necessary to perform printing and colorimetry on a large number of patches of the neighborhood gray every time the gray correction processing is executed, and the correction can be accurately performed in any of passage of time or the change in environment. A description is given below of the operation of the image processing apparatus 1 according to the present embodiment.

Figure 8:
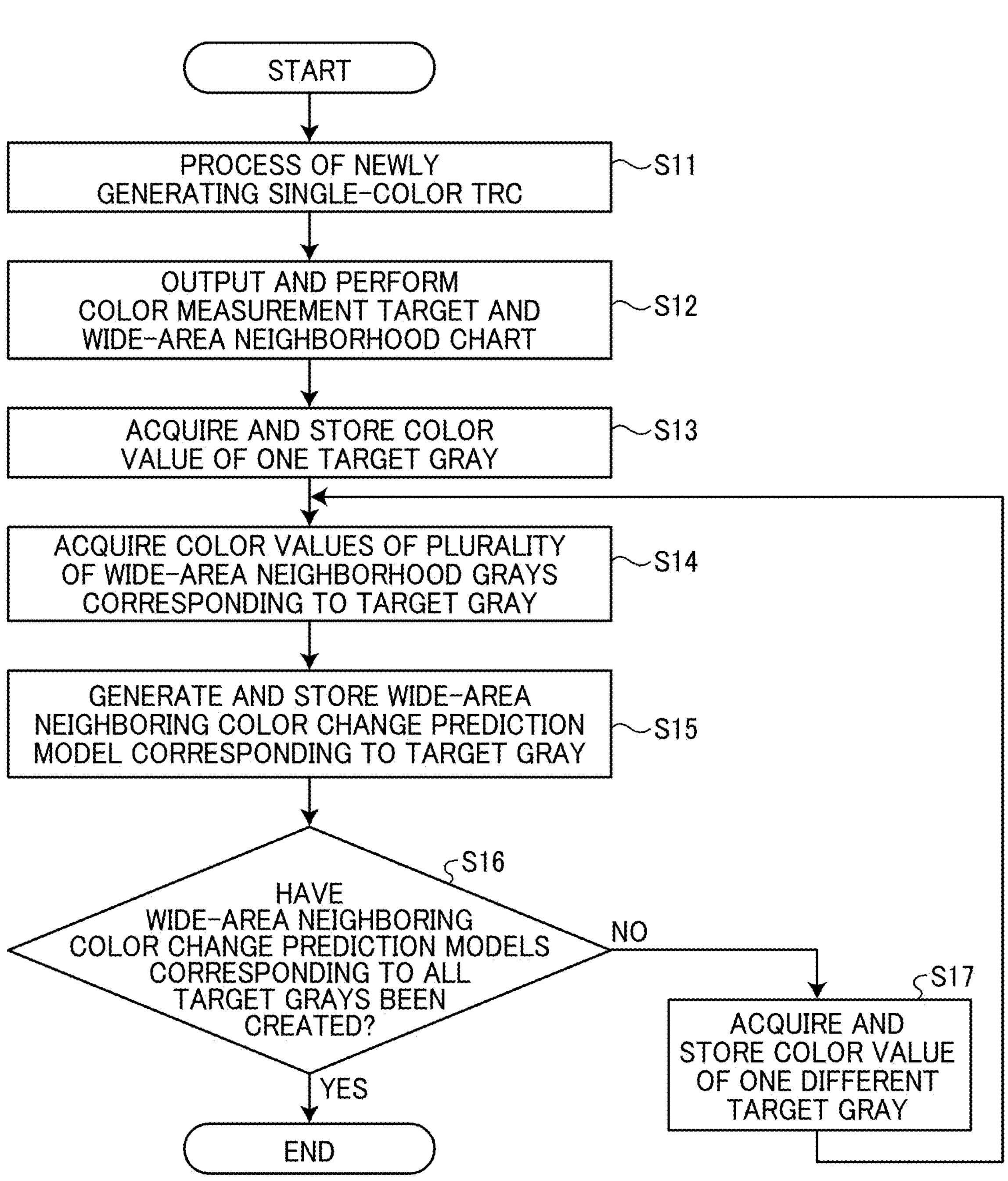
FIG. 8 is a flowchart of a process of target gray and wide-area neighborhood gray acquisition of the image processing apparatus according to the first embodiment of the present disclosure.
Figures 9, 10:
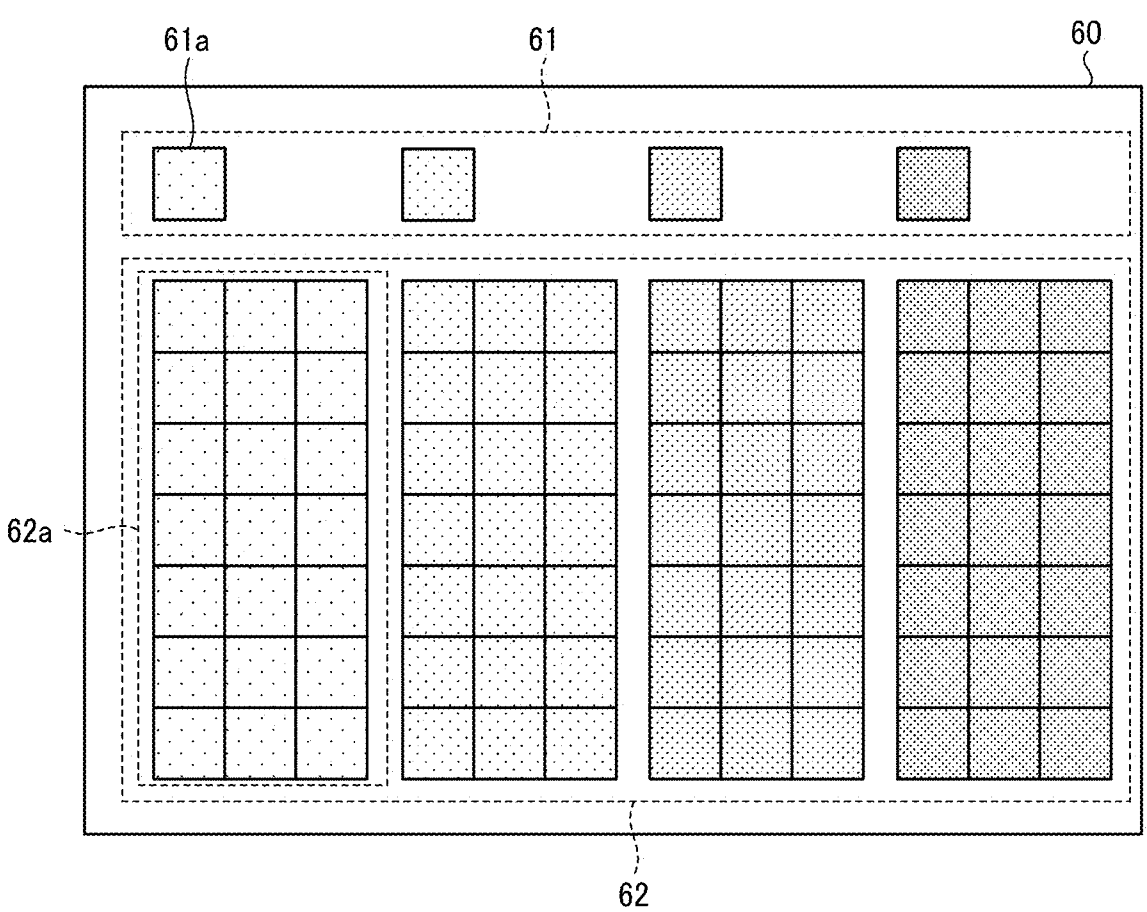
FIG. 9 is a diagram illustrating a target and wide-area neighborhood chart.
FIG. 10 is a diagram illustrating gradation values and color values of a target gray.
Figure 12:
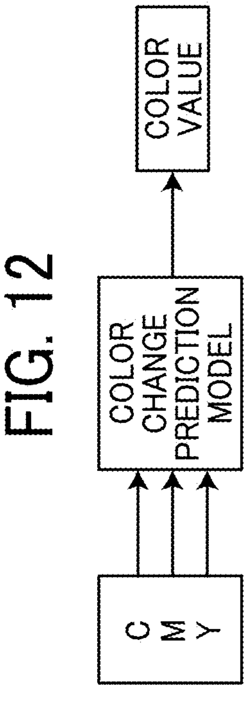
FIG. 12 is a diagram illustrating an operation of a color change prediction model.

FIG. 8 is a flowchart of a process of the target gray and wide-area neighborhood gray acquisition of the image processing apparatus 1 according to the first embodiment of the present disclosure. FIG. 9 is a diagram illustrating a target and wide-area neighborhood chart. FIG. 10 is a diagram illustrating gradation values and color values of the target gray. FIG. 11 is a diagram illustrating gradation values and color values of the wide-area neighborhood gray. FIG. 12 is a diagram illustrating an operation of the color change prediction model. A description is given below of the process of the target gray and wide-area neighborhood gray acquisition of the image processing apparatus 1 according to the present embodiment with reference to FIGS. 8 to 12.

In step S11, the TRC generation unit 15 of the image processing apparatus 1 generates (new generation) a single-color TRC by the above-described single-color calibration. The state of new generation of the single-color TRC corresponds to the "first state" of the present disclosure. The TRC generation unit 15 stores the generated single-color TRC in the storing unit 14. In the present embodiment, it is assumed that the gradation value after the gradation correction is performed by the single-color TRC is used. The single-color calibration is not limited to any particular methods or forms. The process then proceeds to step S12.

In step S12, the chart generation unit 16 of the image processing apparatus 1 generates, for example, a target and wide-area neighborhood chart 60 as illustrated in FIG. 9 in accordance with an operation from the PC 3.

As illustrated in FIG. 9, the target and wide-area neighborhood chart 60 includes a patch group 61 and a patch group 62. The patch group 61 is a group of a plurality of patches 61*a* of the target gray. The patch 61*a* is a patch that is printed out with any gradation values with equal and non-zero values for C, M, and Y (C=M=Y) and zero value for K (K=0). The gradation values of the patch 61*a* correspond to "first gradation values" of the present disclosure. The patch group 62 is a group of a plurality of patch sets 62*a* of wide-area neighborhood gray printed out using gradation values (second gradation values) acquired by modulating one or more gradation values of C, M, and Y in the first color gamut range with respect to the gradation value of each patch 61*a* of the patch group 61. For example, when a patch 61*a* is a patch with the same C, M, and Y gradation values and the gradation value of 10% (C=M=Y=10%), the patch set 62*a* corresponding to the patch 61*a* is a patch set of wide-area neighborhood gray in which the gradation values are allocated in the ranges of ±3% for C, ±4% for M, and ±5% for Y with respect to C=M=Y=10%. In FIG. 9, although the colors of the patches included in each patch set 62*a* are illustrated by the same pattern, the patches have different gradation values in the range described above.

It is recommended that the range of gradation values of each patch set 62*a* be in the maximum range that can be taken due to the passage of time or the change in environment in the color reproduced by the image forming apparatus 2 based on the same gradation value. However, the range of gradation values is not limited to any particular range as long as the range is wider than the patch set 82*a* of the patch group 82 of the wide-area correction and detailed neighborhood chart 80 illustrated in FIG. 18 described later. The specific gradation values of the patch group 61 and the patch group 62 are not limited to any particular values as long as the gradation values satisfy the conditions described above, and the number of patches included in the patch group 61 and the patch group 62 is not also limited to any particular number. The arrangement of the patches of the target and wide-area neighborhood chart 60 is not limited to any particular arrangement, and the patches may be arranged at any positions where the color values of the target gray and the wide-area neighborhood gray can be measured with high accuracy.

Subsequently, the image processing unit 18 of the image processing apparatus 1 performs color conversion on the target and wide-area neighborhood chart 60 generated by the chart generation unit 16 using the single-color TRC generated by the TRC generation unit 15. The image output unit 19 of the image processing apparatus 1 causes the image forming apparatus 2 to print out the target and wide-area neighborhood chart 60 on which the color conversion has been performed. The colorimeter 4 performs colorimetry processing on the target and wide-area neighborhood chart 60 that has been printed out. The colorimetric value acquisition unit 11 of the image processing apparatus 1 acquires the color value of each patch of the target and wide-area neighborhood chart 60 measured by the colorimeter 4. The process then proceeds to step S13.

In step S13, the target color acquisition unit 13 of the image processing apparatus 1 acquires a color value (first color value) of one target gray (referred to as a target gray) among the color values of the patches of the target and wide-area neighborhood chart 60 acquired by the colorimetric value acquisition unit 11, and stores the color value in the storage unit 14 as a color value corresponding to the gradation value of the target gray. FIG. 10 illustrates an example of the color values and the gradation values of the respective target grays acquired by the colorimetric value acquisition unit 11. The process then proceeds to step S14.

In step S14, the prediction model generation unit 12 of the image processing apparatus 1 acquires the color value (second color value) of the wide-area neighborhood gray of the patch set 62*a* corresponding to the target gray among the color values of the patches of the target and wide-area neighborhood chart 60 acquired by the colorimetric value acquisition unit 11. FIG. 11 illustrates an example of the gradation value of the target gray and the gradation value and the color value of the wide-area neighborhood gray corresponding to the target gray. The process then proceeds to step S15.

In step S15, the prediction model generation unit 12 generates the wide-area neighborhood color change prediction model (first color change prediction model) corresponding to the target gray based on the correspondence relation between the gradation value and the color value of the target gray, and the correspondence relation between the gradation value and the color value of the plurality of wide-area neighborhood gray corresponding to the target gray, and stores the wide-area neighborhood color change prediction model in the storage unit 14.

FIG. 12 is a diagram illustrating an operation of a color change prediction model. The color change prediction model is a model that receives the gradation values C, M, and Y as inputs and outputs color values (e.g., Lab values) predicted to be reproduced by the image forming apparatus 2. As a function for implementing the color change prediction model, a general function as a color change prediction model such as a multiple regression equation, a neural network, or interpolation using a direct lookup table can be used. Although the color change prediction model is the wide-area neighborhood color change prediction model in FIG. 8, the operation is the same for the detailed neighborhood color change prediction model described later.

The process then proceeds to step S16.

In step S16, the prediction model generation unit 12 determines whether the wide-area neighborhood color change prediction models corresponding to all target grays have been generated. When the wide-area neighborhood color change prediction models corresponding to all target grays have been generated (YES in step S16), the process of target gray and wide-area neighborhood gray acquisition is ended. When the wide-area neighborhood color change prediction models corresponding to all target grays have not been generated (NO in step S16), the process proceeds to step S17.

In step S17, the target color acquisition unit 13 sets one different target gray as a target gray among the color values of each patch of the target and wide-area neighborhood chart 60 acquired by the colorimetric value acquisition unit 11, acquires the color value (first color value) of the target gray, and stores the color value in the storage unit 14 as a color value corresponding to the gradation value of the target gray. The process then returns to step S14.

Figure 13A:
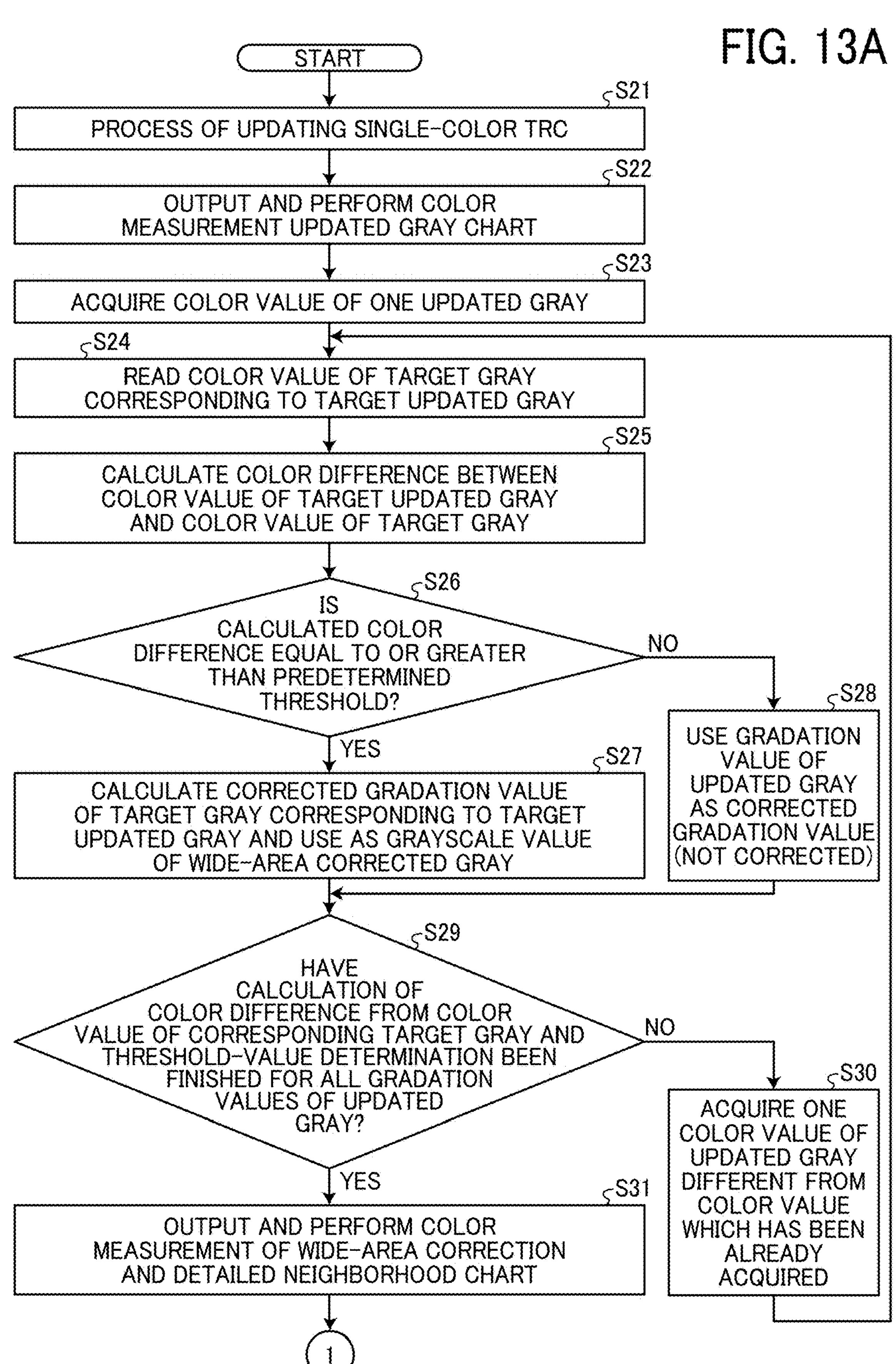
Figure 14:
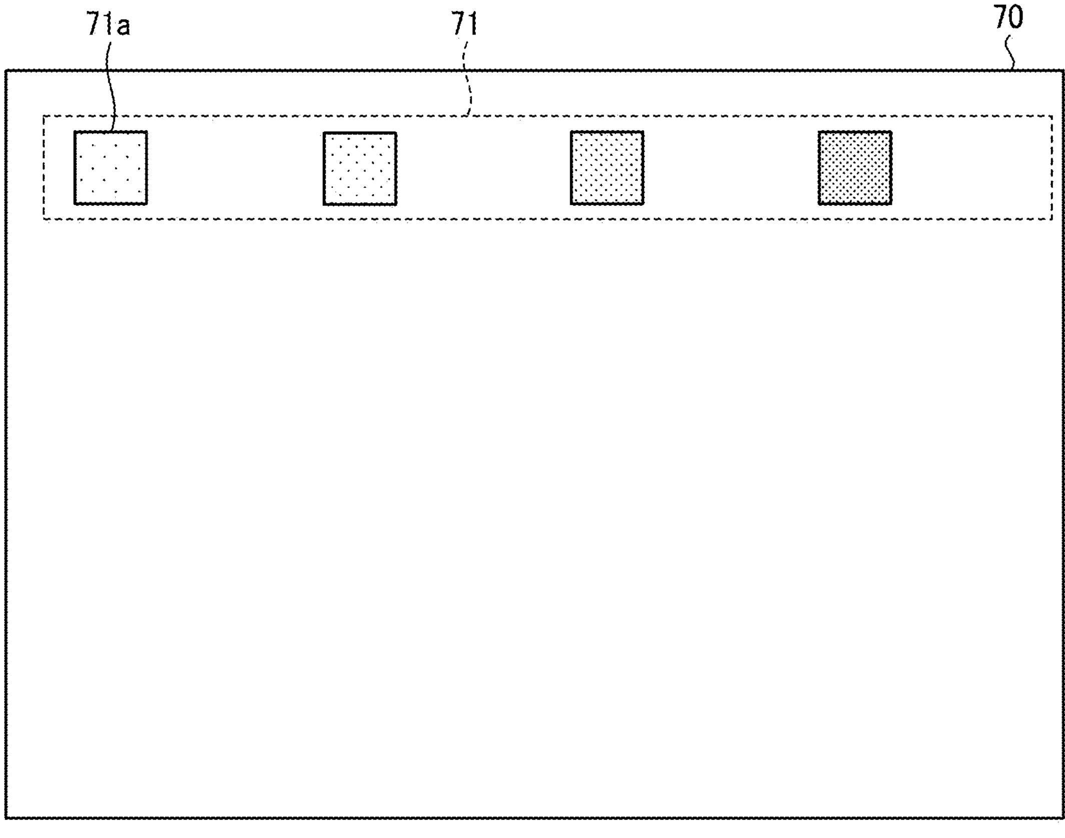
FIG. 14 is a diagram illustrating an updated gray chart.
Figures 17, 18:
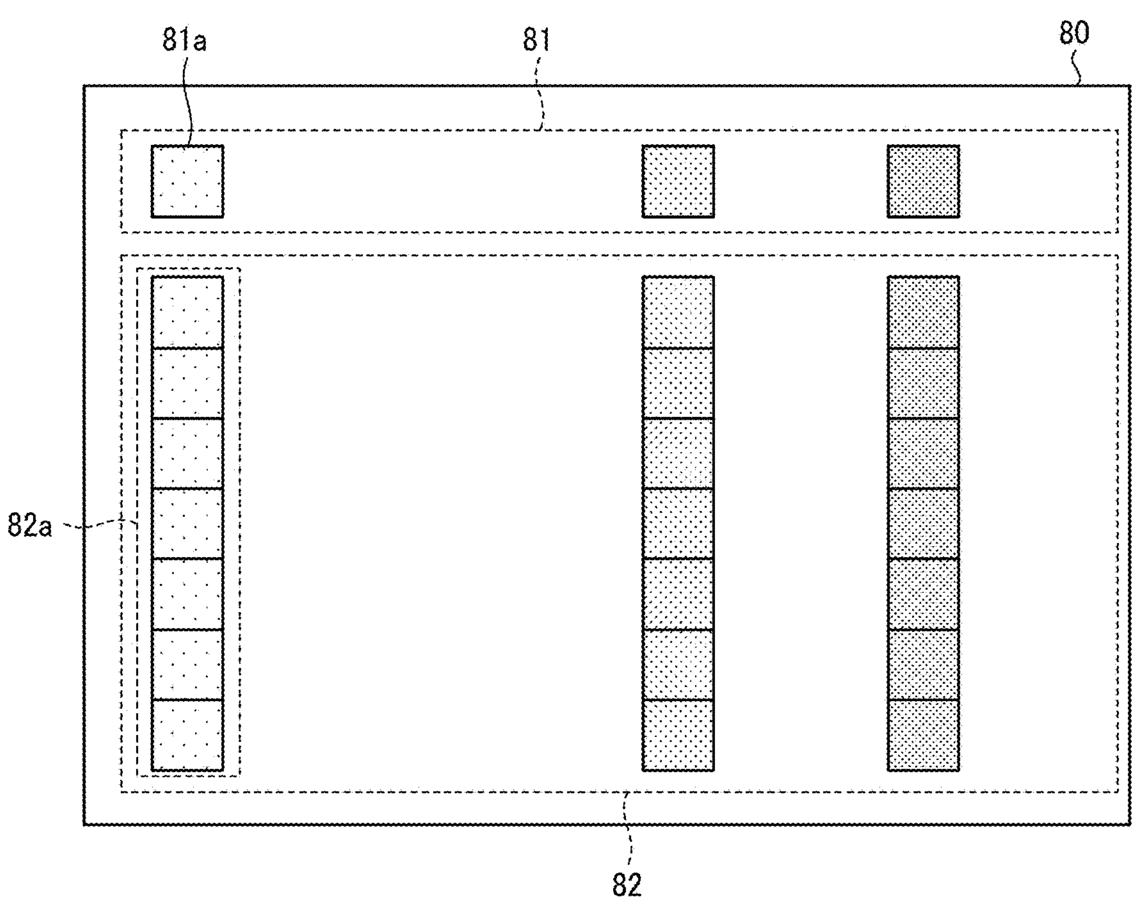
FIG. 17 is a diagram illustrating gradation values and corrected gradation values of a target gray.
FIG. 18 is a diagram illustrating a wide-area correction and detailed neighborhood chart.
Figure 21:
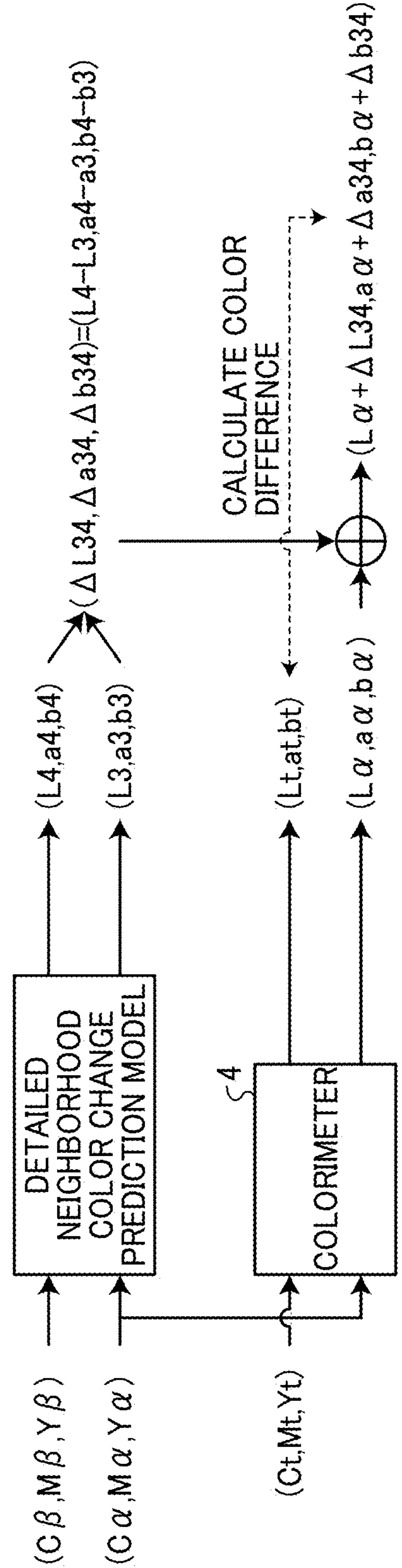
FIG. 21 is a diagram illustrating calculation steps of the process of calculating the gradation values of the detailed corrected gray of the image processing apparatus according to the first embodiment of the present disclosure.

FIGS. 13A and 13B are flowcharts of the gray correction processing of the image processing apparatus 1 according to the first embodiment of the present disclosure. FIG. 14 is a diagram illustrating an updated gray chart. FIG. 15 is a flowchart of a process of calculating gradation values of wide-area corrected gray of the image processing apparatus 1 according to the first embodiment of the present disclosure. FIG. 16 is a diagram illustrating a calculation steps of the process of calculating gradation value of wide-area corrected gray of the image processing apparatus 1 according to the first embodiment of the present disclosure. FIG. 17 is a diagram illustrating gradation values and corrected gradation values of target gray. FIG. 18 is a diagram illustrating a wide-area correction and detailed neighborhood chart. FIG. 19 is a diagram illustrating gradation values and color values of detailed neighborhood gray. FIG. 20 is a flowchart of a process of calculating gradation values of detailed corrected gray of the image processing apparatus 1 according to the first embodiment of the present disclosure. FIG. 21 is a diagram illustrating a calculation steps of the process of calculating gradation values of detailed corrected gray of the image processing apparatus according to the first embodiment of the present disclosure. A description is given below of the processing flow of the gray correction processing of the image processing apparatus 1 according to the present embodiment with reference to FIGS. 13A to 21.

In step 21, in a state where it is assumed that a sufficient time has elapsed from the new generation processing of the single-color TRC described above or the environment has changed and the color printed on the recording medium has changed, the following process is executed in response to a user operation. The TRC generation unit 15 of the image processing apparatus 1 generates a single-color TRC again by the single-color calibration described above. The TRC generation unit 15 then stores the generated single-color TRC in the storage unit 14 to update the single-color TRC. The state when updating the single-color TRC corresponds to the "second state" of the present disclosure. The process then proceeds to step S22.

In step S22, the chart generation unit 16 of the image processing apparatus 1 generates, for example, an updated gray chart 70 as illustrated in FIG. 14 in accordance with, for example, an operation from the PC 3.

As illustrated in FIG. 14, the updated gray chart 70 includes a patch group 71. The patch group 71 is a group of a plurality of updated gray patches 71*a* printed out with the same gradation values as the patches 61*a* of the patch group 61 of the target and wide-area neighborhood chart 60 illustrated in FIG. 9.

The arrangement of the patches in the updated gray chart 70 is not limited to any particular arrangement, and the patches may be arranged at any positions where the color values of the updated gray can be measured with high accuracy.

Subsequently, the image processing unit 18 of the image processing apparatus 1 performs color conversion on the updated gray chart 70 generated by the chart generation unit 16 using the single-color TRC generated by the TRC generation unit 15. The image output unit 19 of the image processing apparatus 1 causes the image forming apparatus 2 to print out the updated gray chart 70 on which the color conversion has been performed. The colorimeter 4 performs colorimetry processing on the updated gray chart 70 that has been printed out. The colorimetric value acquisition unit 11 of the image processing apparatus 1 acquires the color value of each patch 71*a* of the updated gray chart 70 measured by the colorimeter 4. The process then proceeds to step S23.

In step S23, the correction target color acquisition unit 20 of the image processing apparatus 1 acquires a color value (third color value) of one updated gray (referred to as updated target gray) among the color values of the patches 71*a* of the updated gray chart 70 acquired by the colorimetric value acquisition unit 11. The process then proceeds to step S24.

In step S24, the TRC generation unit 15 of the image processing apparatus 1 reads the color value and the gradation value of the target gray corresponding to the updated target gray, in other words, reads the color value and the gradation value of the target gray having the same gradation value as the gradation value of the updated target gray from the storage unit 14. The process then proceeds to step S25.

In step S25, the TRC generation unit 15 calculates a color difference between the color value of the updated target gray acquired by the correction target color acquisition unit 20 and the color value of the target gray corresponding to the updated target gray read from the storage unit 14. The process then proceeds to step S26.

In step S26, the TRC generation unit 15 determines whether the calculated color difference is equal to or greater than a predetermined threshold value. When the color difference is equal to or greater than the predetermined threshold value (YES in step S26), the process proceeds to step S27. When the color difference is less than the predetermined threshold value (NO in step S26), the process proceeds to step S28.

In step S27, the TRC generation unit 15 executes steps S271 to S279 illustrated in FIG. 15 to calculate a corrected gradation value of the target gray corresponding to the updated target gray and stores the corrected gradation value in the storage unit 14 as the gradation value of the wide-area corrected gray corresponding to the target gray. A description is given of processing of step 271 to 279.

In step S271, the TRC generation unit 15 reads the wide-area neighborhood color change prediction model corresponding to the target gray corresponding to the updated target gray from the storage unit 14. The process then proceeds to step S272.

In step S272, the TRC generation unit 15 selects any gradation value (Ca, Ma, Ya) within the gradation range of the acquired wide-area neighborhood color change prediction model. The process then proceeds to step S273.

In step S273, as illustrated in FIG. 16, the TRC generation unit 15 calculates a model predicted color value (L1, a1, b1), which is a color value predicted from a gradation value (Ct, Mt, Yt) of the updated target gray, using the acquired wide-area neighborhood color change prediction model. As illustrated in FIG. 16, the TRC generation unit 15 calculates a model predicted color value (L2, a2, b2), which is a color value predicted from a gradation value (C $\alpha$, M $\alpha$, Y $\alpha$), using the acquired wide-area neighborhood color change prediction model. The process then proceeds to step S274.

In step S274, as illustrated in FIG. 16, the TRC generation unit 15 calculates a difference value ($\Delta$L12, $\Delta$a12, $\Delta$b12)=(L2−L1, a2−a1, b2−a2) between the model predicted color value (L1, a1, b1) and the model predicted color value (L2, a2, b2). The process then proceeds to step S275.

In step S275, as illustrated in FIG. 16, the TRC generation unit 15 adds the calculated difference value ($\Delta$L12, $\Delta$a12, $\Delta$b12) to a color value (Lm, am, bm) of the updated target gray acquired by the correction target color acquisition unit 20 to calculate a predicted color value (Lm+$\Delta$L12, am+$\Delta$a12, bm+$\Delta$b12). The process then proceeds to step S276.

In step S276, as illustrated in FIG. 16, the TRC generation unit 15 calculates the color difference between the calculated predicted color value (Lm+$\Delta$L12, am+$\Delta$a12, bm+$\Delta$b12) and a color value (Lt, at, bt) of the target gray read from the storage unit 14. The process then proceeds to step S277.

In step S277, the TRC generation unit 15 determines whether the calculated color difference is equal to or less than the predetermined threshold value. When the color difference is equal to or less than the predetermined threshold value (YES in step S277), the process proceeds to step S278. When the color difference exceeds the predetermined threshold value (NO in step S277), the process proceeds to step S279.

In step S278, the TRC generation unit 15 calculates the selected gradation value (C$\alpha$, M$\alpha$, Y$\alpha$) as the corrected gradation value (first corrected gradation value) of the target gray corresponding to the updated target gray, and stores the calculated gradation value in the storage unit 14 as the gradation value of the wide-area corrected gray corresponding to the target gray. The process then proceeds to step S29.

In step S279, the TRC generation unit 15 selects one gradation value (C$\alpha$, M$\alpha$, Y$\alpha$) different from the gradation value that has been already selected within the gradation range of the acquired wide-area neighborhood color change prediction model. The process then returns to step S273.

In step S28, the TRC generation unit 15 calculates the gradation value of the updated target gray (i.e., the gradation value of the corresponding target gray) as the corrected gradation value corresponding to the target gray and stores the corrected gradation value in the storage unit 14. In other words, the TRC generation unit 15 does not correct the gradation value of the target gray. The process then proceeds to step S29.

In step S29, the TRC generation unit 15 determines whether the calculation of the color difference from the color value of the corresponding target gray and the determination of threshold value (the processing of steps S24 to S28) have been finished for all gradation values of the updated target gray. When the TRC generation unit 15 determines that the calculation of the color difference and the determination of threshold value have been finished (YES in step S29), the process proceeds to step S31. When the TRC generation unit 15 determines that the calculation of the color difference and the determination of threshold value have not been finished (NO in step S29), the process proceeds to step S30.

In step S30, the correction target color acquisition unit 20 acquires one color value of the updated gray different from the color value which has been already acquired among the color values of the patches 71*a* of the updated gray chart 70 acquired by the colorimetric value acquisition unit 11 as a new color value of the updated target gray. The process then returns to step S24.

In step S31, the display control unit 22 of the image processing apparatus 1 displays, for example, the corrected gradation value of the target gray calculated by the TRC generation unit 15 on the display 508. As described above, FIG. 17 is a diagram illustrating the gradation values and the corrected gradation values of the target gray. In the example illustrated in FIG. 17, the target gray having the gradation value C=M=Y=20% is determined in step S26 that the color difference is less than the threshold value, and since the gradation value of the target gray does not need to be corrected, the corrected gradation value is also C=M=Y=20%.

Then, the chart generation unit 16 generates, for example, a wide-area correction and detailed neighborhood chart 80 (first chart) as illustrated in FIG. 18.

As illustrated in FIG. 18, the wide-area correction and detailed neighborhood chart 80 includes a patch group 81 and a patch group 82. The patch group 81 is a group of a plurality of patches 81*a* printed out with the gradation values of the wide-area corrected gray calculated by the TRC generation unit 15 in step S27. The patch group 82 is a group of a plurality of patch sets 82*a* of the detailed neighborhood gray printed out using gradation values (third gradation values) acquired by modulating one or more gradation values of C, M, and Y in the second color gamut range with respect to the gradation value of each patch 81*a* of the patch group 81. For example, when a patch 81*a* is a patch with the gradation value that is C=11%, M=12%, and Y=9%, the patch set 82*a* corresponding to the patch 81*a* is a patch set of detailed neighborhood gray in which the gradation value is allocated in the range of ±2% for C, ±2% for M, and ±3% for Y with respect to C=11%, M=12%, and Y=9%. In FIG. 18, although the colors of the patches included in each patch set 82*a* are illustrated by the same pattern, the patches have different gradation values in the range described above. As illustrated in the wide-area correction and detailed neighborhood chart 80 of FIG. 18, the gradation value of the target gray corresponding to the updated target gray whose color difference is determined to be less than the predetermined threshold value by the TRC generation unit 15 in step S26 is not corrected, and thus the corresponding gradation value of the wide-area corrected gray is not calculated. Accordingly, the patches of the wide-area corrected gray and the detailed neighborhood gray corresponding to the target gray are not printed out.

The range of gradation values of each patch set 82*a* is not particularly limited to any particular range as long as the range of the gradation value is narrower than the range of gradation values of the patch set 62*a* of the target and wide-area neighborhood chart 60 illustrated in FIG. 8. The number of patches included in the patch set 82*a* may be equal to or less than the number of patches of the corresponding patch set 62*a*. The arrangement of the patches of the wide-area correction and detailed neighborhood chart 80 is not limited to any particular arrangement, and the patches are arranged at any positions where the color values of the wide-area corrected gray and the detailed neighborhood gray can be measured with high accuracy.

Subsequently, the image processing unit 18 performs color conversion on the wide-area correction and detailed neighborhood chart 80 generated by the chart generation unit 16 using the single-color TRC generated by the TRC generation unit 15. The image output unit 19 of the image processing apparatus 1 causes the image forming apparatus 2 to print out the wide-area correction and detailed neighborhood chart 80 on which the color conversion has been performed. The colorimeter 4 performs colorimetry processing on the wide-area correction and detailed neighborhood chart 80 that has been printed out. The colorimetric value acquisition unit 11 of the image processing apparatus 1 acquires the color value of each patch of the wide-area correction and detailed neighborhood chart 80 measured by the colorimeter 4. The process then proceeds to step S32.

In step S32, the correction target color acquisition unit 20 acquires a color value (fourth color value) of one wide-area corrected gray (referred to as a target wide-area corrected gray) among the color values of the patches 81*a* of the wide-area correction and detailed neighborhood chart 80 acquired by the colorimetric value acquisition unit 11. The process then proceeds to step S33.

In step S33, the TRC generation unit 15 reads the color value and the gradation value of the target gray corresponding to the target wide-area corrected gray from the storage unit 14. The process then proceeds to step S34.

In step S34, the TRC generation unit 15 calculates a color difference between the color value of the target wide-area corrected gray acquired by the correction target color acquisition unit 20 and the color value of the target gray corresponding to the updated target gray read from the storage unit 14. The process then proceeds to step S35.

In step S35, the TRC generation unit 15 determines whether the calculated color difference is equal to or greater than a predetermined threshold value. When the color difference is equal to or greater than the predetermined threshold value (YES in step S35), the process proceeds to step S36. When the color difference is less than the predetermined threshold value (NO in step S35), the process proceeds to step S39.

In step S36, the prediction model generation unit 12 acquires the color value (fifth color value) of the detailed neighborhood gray of the patch set 82*a* corresponding to the target wide-area corrected gray among the color values of the patches of the wide-area correction and detailed neighborhood chart 80 acquired by the colorimetric value acquisition unit 11. FIG. 19 illustrates an example of the gradation values of the target wide-area corrected gray, and the gradation values and the color values of the detailed neighborhood gray corresponding to the target wide-area corrected gray. The process then proceeds to step S37.

In step S37, the prediction model generation unit 12 generates a detailed neighborhood color change prediction model (second color change prediction model) corresponding to the target wide-area corrected gray based on the correspondence relation between the gradation value and the color value of the target wide-area corrected gray and the correspondence relation between the gradation value and the color value of the plurality of detailed neighborhood grays corresponding to the target wide-area corrected gray, and stores the generated model in the storage unit 14. The process then proceeds to step S38.

In step S38, the TRC generation unit 15 executes steps S381 to S389 illustrated in FIG. 20 to calculate the corrected gradation value of the target wide-area corrected gray and stores the corrected gradation value in the storage unit 14 as the gradation value of the detailed corrected gray corresponding to the target wide-area corrected gray. A description is given of processing of step 381 to 389.

In step S381, the TRC generation unit 15 reads the detailed neighborhood color change prediction model corresponding to the target wide-area corrected gray from the storage unit 14. The process then proceeds to step S382.

In step S382, the TRC generation unit 15 selects one gradation value (Cβ, Mβ, Yβ) within the gradation range of the acquired detailed neighborhood color change prediction model. The process then proceeds to step S383.

In step S383, as illustrated in FIG. 21, the TRC generation unit 15 calculates a model predicted color value (L3, a3, b3) which is a color value predicted from the gradation value (Cα, Mα, Yα) of the target wide-area corrected gray by using the acquired detailed neighborhood color change prediction model. As Illustrated in FIG. 21, the TRC generation unit 15 calculates a model predicted color value (L4, a4, b4) which is a color value predicted from the selected gradation value (Cβ, Mβ, Yβ) using the acquired detailed neighborhood color change prediction model. The process then proceeds to step S384.

In step S384, as illustrated in FIG. 21, the TRC generation unit 15 calculates a difference value (ΔL34, Δa34, Δb34)=(L4−L3, a4−a3, b4−3) between the model predicted color value (L3, a3, b3) and the model predicted color value (L4, a4, b4). The process then proceeds to step S385.

In step S385, as illustrated in FIG. 21, the TRC generation unit 15 adds the calculated difference value (ΔL34, Δa34, Δb34) to a color value (Lα, aα, bα) of the target wide-area corrected gray acquired by the correction target color acquisition unit 20 to calculate a predicted color value (La+ΔL34, ax+4a34, ba+Δb34). The process then proceeds to step S386.

In step S386, as illustrated in FIG. 21, the TRC generation unit 15 calculates the color difference between the calculated predicted color value (Lα+ΔL34, aα+Δa34, bα+Δb34) and a color value (Lt, at, bt) of the target gray read from the storage unit 14. The process then proceeds to step S387.

In step S387, the TRC generation unit 15 determines whether the calculated color difference is equal to or less than the predetermined threshold value. When the color difference is equal to or less than the predetermined threshold value (YES in step S387), the process proceeds to step S388. When the color difference exceeds the predetermined threshold value (NO in step S387), the process proceeds to step S389.

In step S388, the TRC generation unit 15 calculates the selected gradation value (Cβ, Mβ, Yβ) as the corrected gradation value (second corrected gradation value) of the target wide-area corrected gray and stores the calculated gradation value in the storage unit 14 as the gradation value of the detailed corrected gray corresponding to the target wide-area corrected gray. The process then proceeds to step S40.

In step S389, the TRC generation unit 15 selects one gradation value (Cβ, Mβ, Yβ) different from the gradation value that has been already selected within the gradation range of the acquired detailed neighborhood color change prediction model. The process then returns to step S383.

In step S39, the TRC generation unit 15 calculates the gradation value of the target wide-area corrected gray as the corrected gradation value corresponding to the target gray and stores the corrected gradation value in the storage unit 14. The process then proceeds to step S40.

In step S40, the TRC generation unit 15 determines whether the calculation of the color difference from the color value of the corresponding target gray and the determination of threshold value (the processing of steps S33 to S39) have been finished for all gradation values of the wide-area corrected gray. When the TRC generation unit 15 determines that the calculation of the color difference and the determination of threshold value have been finished (YES in step S40), the display control unit 22 displays, for example, the gradation value of detailed corrected gray calculated by the TRC generation unit 15 on the display 508 and ends the gray correction processing. On the other hand, when the TRC generation unit 15 determines that the calculation of the color difference and the determination of threshold value have not been finished (NO in step S40), the process proceeds to step S41.

In step S41, the correction target color acquisition unit 20 acquires one color value (fourth color value) of the wide-area corrected gray different from the color value which has been already acquired among the color values of the patches 81*a* of the wide-area correction and detailed neighborhood chart 80 acquired by the colorimetric value acquisition unit 11 as a new color value of the target wide-area corrected gray. The process then returns to step S33.

When the gray correction processing is ended, the TRC generation unit 15 generates a single-color TRC (gray-corrected single-color TRC) in which the corrected gradation values calculated in steps S28, S38, and S39 are reflected in the single-color TRC generated in step S21 and updates the single-color TRC already stored in the storage unit 14. After that, the image processing unit 18 performs the calibration processing using the single-color TRC (the gray-corrected single-color TRC), and thus the input gradation value is converted into the output gradation value.

The subsequent processing is different in accordance with whether the color difference is equal to or greater than the threshold values in steps S26 and S35 in FIGS. 13A and 13B. The determination processing is executed using the threshold values that are set in advance in the image processing apparatus 1, but it is not particularly limited thereto. The results of the color difference may be displayed on the display 508 and the user may choose which processing to proceed in accordance with the results of the color difference.

As described above, in the image processing apparatus 1 according to the present embodiment, the target color acquisition unit 13 acquires the color values of the patches corresponding to the respective gradation values measured by the colorimeter 4 from the target and wide-area neighborhood chart 60 printed out from the image forming apparatus 2 based on the gradation values of the plurality of target grays in the first state. In the first state, the prediction model generation unit 12 acquires the color values of the patches corresponding to the respective gradation values of the wide-area neighborhood gray measured by the colorimeter 4 from the target and wide-area neighborhood chart 60 printed out from the image forming apparatus 2 based on the plurality of gradation values of the wide-area neighborhood gray within a first color gamut range including the gradation values of the respective target grays. In the second state different from the first state, the correction target color acquisition unit 20 acquires respective color values of the patches corresponding to the gradation values of the respective updated grays measured by the colorimeter 4 from the updated gray chart 70 printed out from the image forming apparatus 2 based on the gradation values of the respective updated grays. The TRC generation unit 15 calculates the corrected gradation value to correct the gradation value of the target gray based on the gradation value of the target gray, the color value corresponding to the gradation value, the gradation values of the plurality of wide-area neighborhood grays, the color values corresponding to the gradation values, and the gradation value within the first color gamut range. In the second state, the correction target color acquisition unit 20 acquires the color value of the patch corresponding to the corrected gradation value measured by the colorimeter 4 from the wide-area correction and detailed neighborhood chart 80 printed out from the image forming apparatus 2 based on the corrected gradation value calculated by the TRC generation unit 15. In the second state, the prediction model generation unit 12 acquires respective color values of the patches corresponding to the respective gradation values measured by the colorimeter 4 from the wide-area correction and detailed neighborhood chart 80 printed out from the image forming apparatus 2 based on the plurality of gradation values of the detailed neighborhood gray in the second color gamut range narrower than the first color gamut range. The TRC generation unit 15 calculates the gradation value of the wide-area corrected gray as the corrected gradation value based on the corrected gradation value, the color value corresponding to the corrected gradation value, the plurality of gradation values of the detailed neighborhood gray with respect to the corrected gradation value, the respective color values corresponding to each gradation value, and the gradation value within the second color gamut range. As described above, since the color gamut range of the gradation values of the detailed neighborhood gray used for the second correction (i.e., used for calculating the second time corrected gradation value) is set to be narrower than the color gamut range of the gradation values of the wide-area neighborhood gray used for the first correction (i.e., used for calculating the first time corrected gradation value), it is possible to reduce an increase in the workload of the colorimetry processing for each correction. Since it is assumed that the wide-area corrected gray is obviously closer to the target gray than the updated gray, the target gray can be sufficiently included the detailed neighborhood gray even if the detailed neighborhood gray is set in a narrow color gamut. In other words, even in the combination of each gradation value of the detailed neighborhood gray to be printed out when the image processing apparatus 1 executes the gray correction processing, sufficient prediction accuracy can be maintained. As a result, even in the passage of time or the change in environment, the target mixed color can be corrected with high accuracy.

Second Embodiment

An information processing system 100 according to a second embodiment of the present disclosure is described focusing on differences from the information processing system 100 according to the first embodiment. In the first embodiment, even if sufficient correction can be performed by the first correction using the wide-area neighborhood color change prediction model, the operation of printing out the wide-area corrected gray for checking the first correction result and simultaneously printing out the detailed neighborhood gray for generating the detailed neighborhood color change prediction model has been described. In the second embodiment, a description is given below of an operation in which, after the calculation of the gradation value of the wide-area corrected gray, the detailed neighborhood gray is not printed out, but only the wide-area corrected gray is printed out and measured once. After that, the detailed neighborhood gray corresponding to the target gray alone determined to be insufficiently corrected in the first correction is printed out. The overall configuration of the information processing system 100, the hardware configuration and the functional blocks configuration of the image processing apparatus 1, and the structure and the hardware configuration of the image forming apparatus 2 according to the present embodiment are the same as those described in the first embodiment. The process of target gray and wide-area neighborhood gray acquisition of the image processing apparatus 1 according to the present embodiment is the same as the operation described in the first embodiment.

Figure 22A:
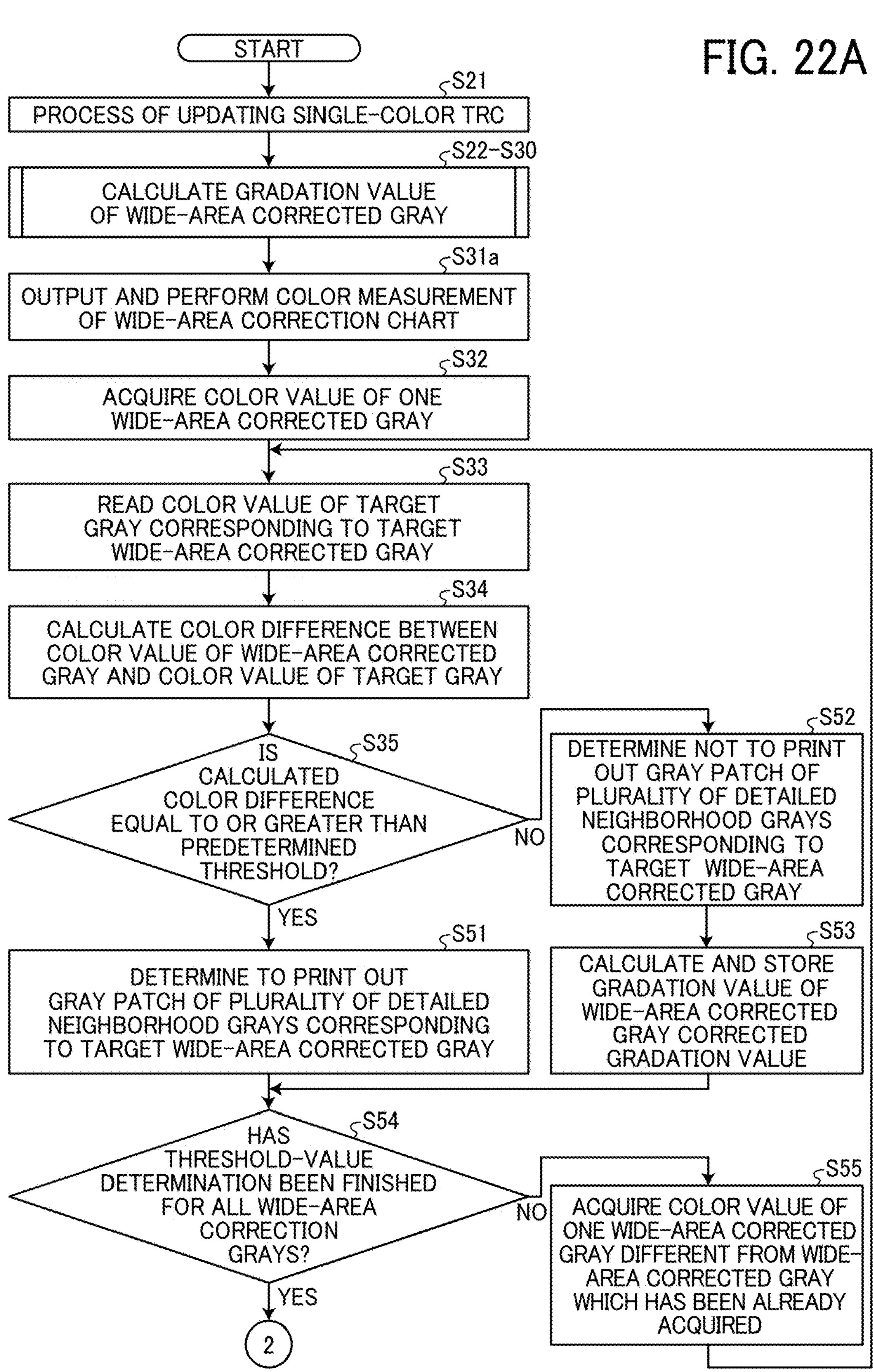
FIGS. 22A and 22B are flowcharts of gray correction processing of an image processing apparatus according to a second embodiment of the present disclosure.
Figure 22B:
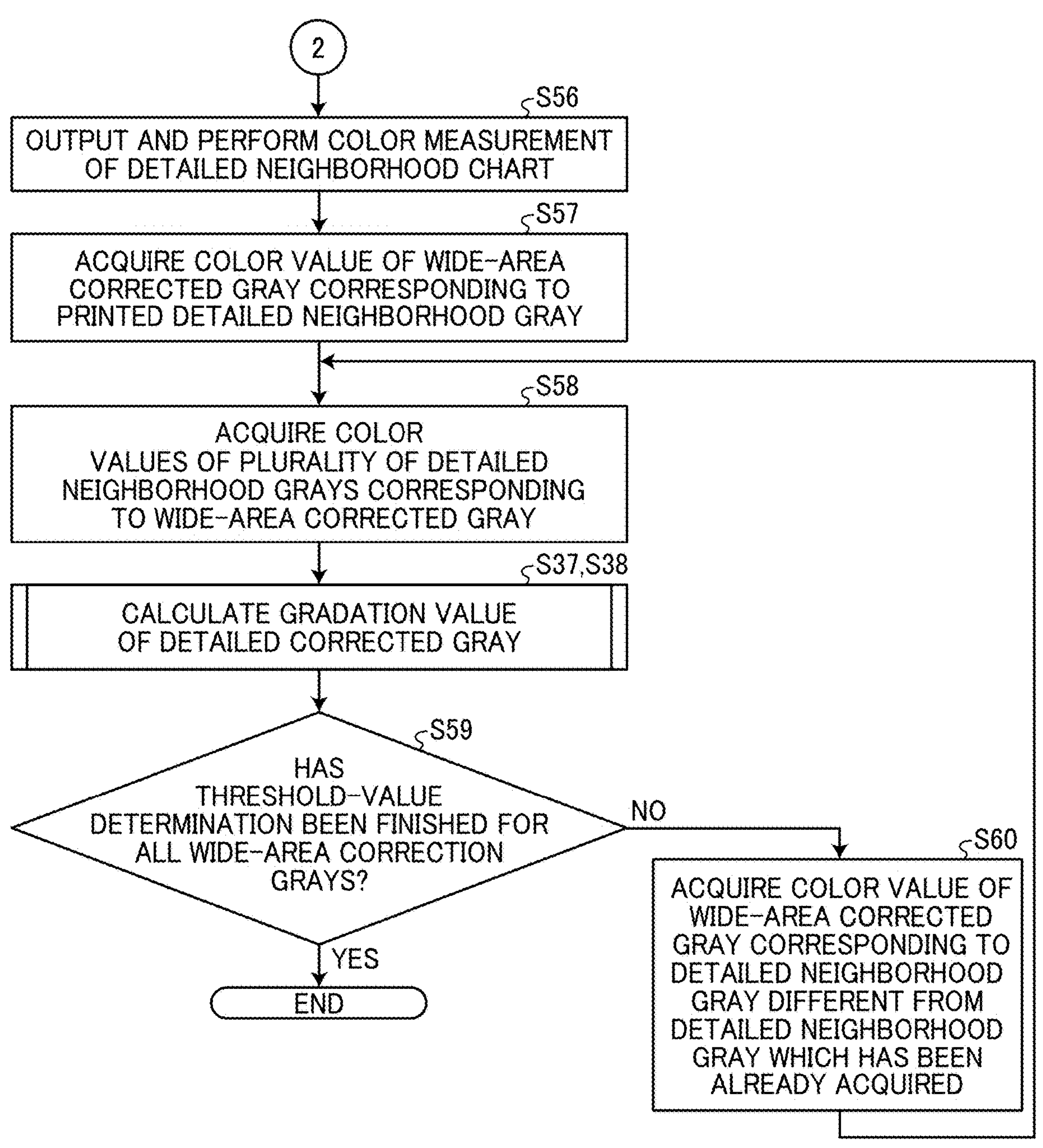
Figure 23:
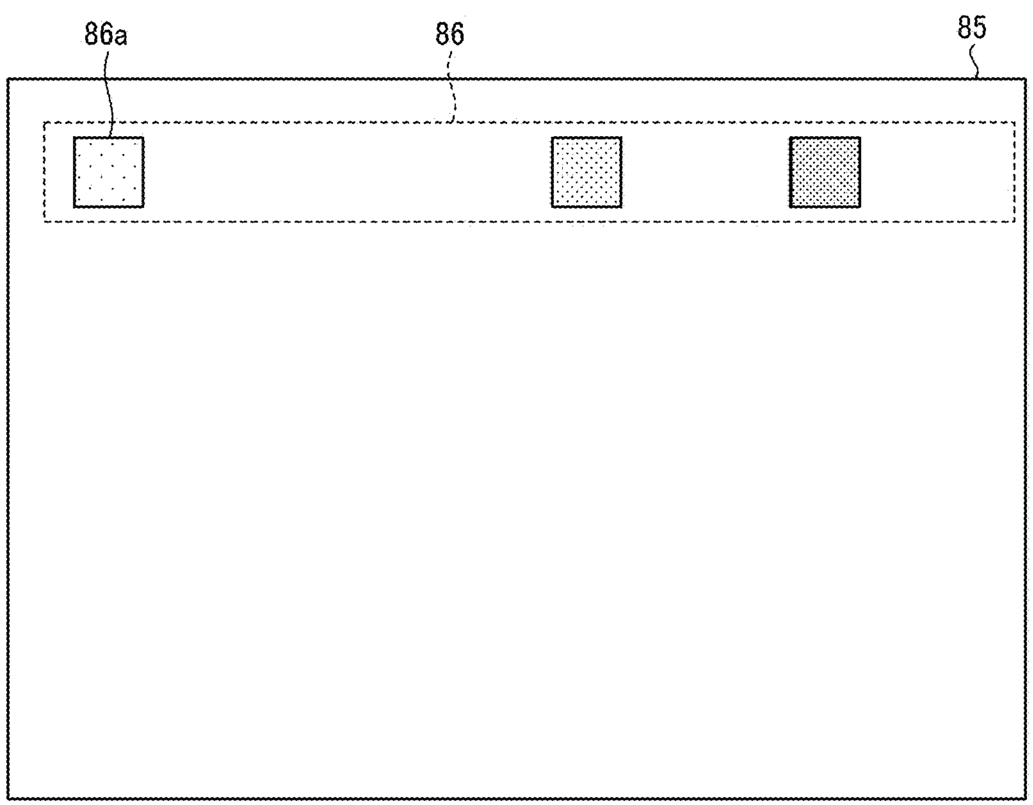
FIG. 23 is a diagram illustrating a wide-area correction chart.
Figure 24:
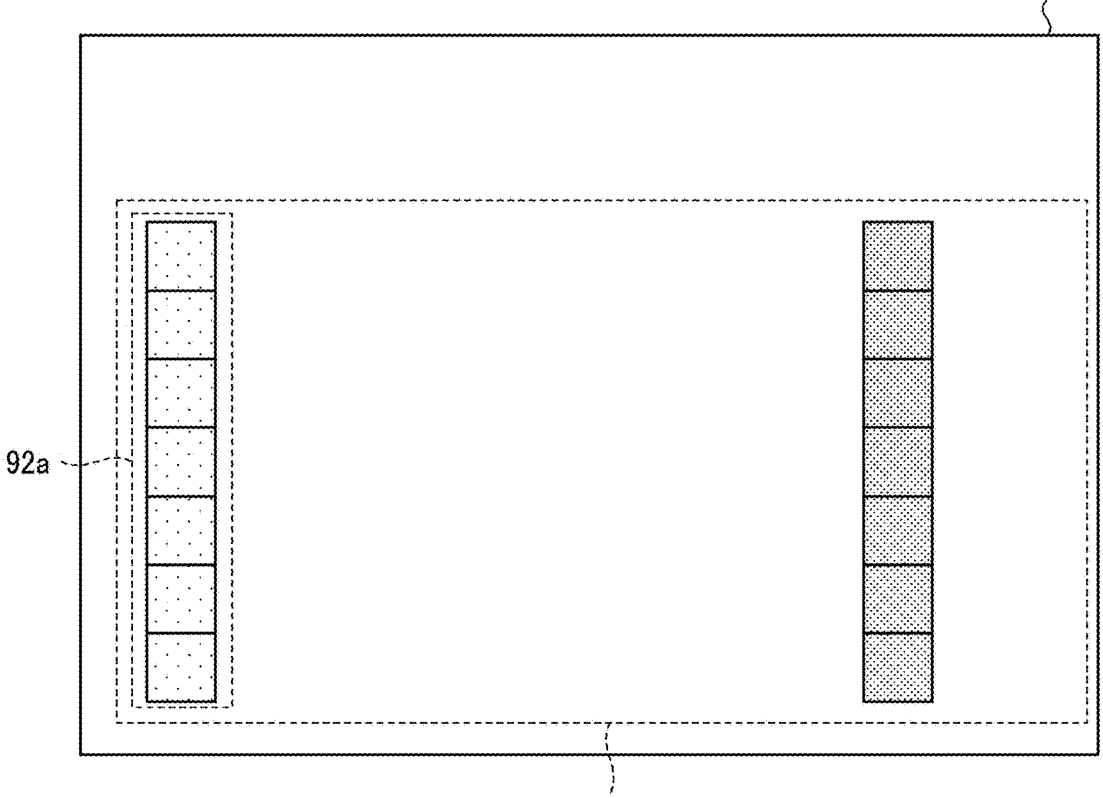
FIG. 24 is a diagram illustrating a detailed neighborhood chart.

FIGS. 22A and 22B are flowcharts of gray correction processing of the image processing apparatus 1 according to the second embodiment of the present disclosure. FIG. 23 is a diagram illustrating a wide-area correction chart. FIG. 24 is a diagram illustrating a detailed neighborhood chart. A description is given below of the processing flow of the gray correction processing of the image processing apparatus 1 according to the present embodiment with reference to FIGS. 22A to 24.

The processing of steps S21 to S30 illustrated in FIG. 22A are the same as the processing of steps S21 to S30 illustrated in FIG. 13A described above. In step S29, the TRC generation unit 15 determines whether the calculation of the color difference from the color value of the corresponding target gray and the determination of threshold value (the processing of steps S24 to S28) have been finished for all gradation value of the updated target gray. When the TRC generation unit 15 determines that the calculation of the color difference and the determination of threshold value has been finished (YES in step S29), the process proceeds to step S31*a*.

In step S31*a*, the display control unit 22 of the image processing apparatus 1 displays, for example, the corrected gradation value of the target gray calculated by the TRC generation unit 15 on the display 508. Then, the chart generation unit 16 generates, for example, a wide-area correction chart 85 (second chart) as illustrated in FIG. 23. As illustrated in FIG. 23, the wide-area correction chart 85 includes a patch group 86. The patch group 86 is a group of a plurality of patches 86*a* printed out with the gradation values of the wide-area corrected gray calculated by the TRC generation unit 15 in step S27. As illustrated in the wide-area correction chart 85 of FIG. 23, the gradation value of the target gray corresponding to the updated target gray whose color difference is determined to be less than the predetermined threshold value by the TRC generation unit 15 in step S26 is not corrected, and thus the gradation value of the corresponding gradation value of the wide-area corrected gray is not calculated. Accordingly, the patches of the wide-area corrected gray corresponding to the target gray are not printed out.

The arrangement of the patches 86*a* in the wide-area correction chart 85 is not limited, and the patches may be arranged at any positions where the color values of the wide-area corrected gray can be measured with high accuracy.

Subsequently, the image processing unit 18 performs color conversion on the wide-area correction chart 85 generated by the chart generation unit 16 using the single-color TRC generated by the TRC generation unit 15. The image output unit 19 of the image processing apparatus 1 causes the image forming apparatus 2 to print out the wide-area correction chart 85 on which the color conversion has been performed. The colorimeter 4 performs colorimetry processing on the wide-area correction chart 85 that has been printed out. The colorimetric value acquisition unit 11 of the image processing apparatus 1 acquires the color value of each patch of the wide-area correction chart 85 measured by the colorimeter 4. The process then proceeds to step S32.

The processing of steps S32 to S35 illustrated in FIG. 22B are the same as the processing of steps S32 to S35 illustrated in FIG. 13B described above. In step S35, as a result of the determination by the TRC generation unit 15 whether the calculated color difference is equal to or greater than the predetermined threshold value, when the color difference is equal to or greater than the predetermined threshold value (YES in step S35), the process proceeds to step S51, and when the color difference is less than the predetermined threshold value (NO in step S35), the process proceeds to step S52.

In step S51, the TRC generation unit 15 determines to print out the patch of the detailed neighborhood gray corresponding to the target wide-area corrected gray. The TRC generation unit 15 then stores the gradation value and the color value of the target wide-area corrected gray in the storage unit 14. The process then proceeds to step S54.

In step S52, the TRC generation unit 15 determines that the patches of the detailed neighborhood gray corresponding to the target wide-area corrected gray are not to be printed out. The process then proceeds to step S53.

In step S53, the TRC generation unit 15 calculates the gradation value of the target wide-area corrected gray as the corrected gradation value corresponding to the target gray and stores the corrected gradation value in the storage unit 14. The process then proceeds to step S54.

In step S54, the TRC generation unit 15 determines whether the calculation of the color difference from the color value of the corresponding target gray and the determination of threshold value (the processing in steps S33 to S35 and S51 to S53) have been finished for all gradation values of the wide-area corrected gray. When the TRC generation unit 15 determines that the calculation of the color difference and the determination of threshold value have been finished (YES in step S54), the process proceeds to step S56. When the TRC generation unit 15 determines that the calculation of the color difference and the determination of threshold value have not been finished (NO in step S54), the process proceeds to step S55.

In step S55, the correction target color acquisition unit 20 acquires one color value of the updated gray different from the color value which has been already acquired among the color values of the patches 86*a* of the wide-area correction chart 85 acquired by the colorimetric value acquisition unit 11 as a new color value of the target wide-area corrected gray. The process then returns to step S33.

In step S56, the chart generation unit 16 generates, for example, a detailed neighborhood chart 90 (third chart) as illustrated in FIG. 24.

As illustrated in FIG. 24, the detailed neighborhood chart 90 includes a patch group 92. The patch group 92 is a group of a plurality of patch sets 92*a* of detailed neighborhood gray printed out using gradation values acquired by modulating one or more gradation values of C, M, and Y in the second color gamut range with respect to the gradation value determined to print out the patches of the detailed neighborhood gray in step S51 among the gradation values of the patches 86*a* of the patch group 86 of the wide-area correction chart 85 described above. For example, when a patch 86*a* is a patch with the gradation value that is C=11%, M=12%, and Y=9%, the patch set 92*a* corresponding to the patch 86*a* is a patch set of detailed neighborhood gray in which the gradation value is allocated in the range of ±2% for C, ±2% for M, and ±3% for Y with respect to C=11%, M=12%, and Y=9%. In FIG. 24, although the colors of the patches included in each patch set 92*a* are illustrated by the same pattern, the patches have different gradation values in the range described above.

The range of the gradation value of each patch set 92*a* is not particularly limited as long as the range of the gradation value is narrower than the range of the gradation value of the patch set 62*a* of the target and wide-area neighborhood chart 60 illustrated in FIG. 8. The number of patches included in the patch set 92*a* may be equal to or less than the number of patches of the corresponding patch set 62*a*. The arrangement of the patches in the detailed neighborhood chart 90 is not limited, and the patches may be arranged at any positions where the color values of the detailed neighborhood gray can be measured with high accuracy.

Subsequently, the image processing unit 18 performs color conversion on the detailed neighborhood chart 90 generated by the chart generation unit 16 using the single-color TRC generated by the TRC generation unit 15. The image output unit 19 of the image processing apparatus 1 causes the image forming apparatus 2 to print out the detailed neighborhood chart 90 on which the color conversion has been performed. The colorimeter 4 performs colorimetry processing on the detailed neighborhood chart 90 that has been printed out. The colorimetric value acquisition unit 11 of the image processing apparatus 1 acquires the color value of each patch of the detailed neighborhood chart 90 measured by the colorimeter 4. The process then proceeds to step S57.

In step S57, the correction target color acquisition unit 20 reads, from the storage unit 14, to acquire the gradation value and the color value of one wide-area corrected gray (referred to as a target wide-area corrected gray) among the wide-area corrected grays corresponding to the detailed neighborhood gray that has been printed out. The process then proceeds to step S58.

In step S58, the prediction model generation unit 12 acquires the color value of the detailed neighborhood gray of the patch set 92*a* corresponding to the target wide-area corrected gray among the color values of the patches of the detailed neighborhood chart 90 acquired by the colorimetric value acquisition unit 11. The process then proceeds to step S37. The processing of steps S37 and S38 illustrated in FIG. 22B are the same as the processing of steps S37 and S38 illustrated in FIG. 13B described above. The process then proceeds to step S59.

In step S59, the TRC generation unit 15 determines whether the calculation processing (the processing in steps S58, S37, and S38) of the corrected gradation value has been finished for all gradation values of the wide-area corrected gray corresponding to the detailed neighborhood gray that has been printed out. When the TRC generation unit 15 determines that the calculation processing of the corrected gradation value has been finished (YES in step S59), the display control unit 22 displays, for example, the gradation value of detailed corrected gray calculated by the TRC generation unit 15 on the display 508 and ends the gray correction processing. On the other hand, when the TRC generation unit 15 determines that the calculation processing of the corrected gradation value has not been finished (NO in step S59), the process proceeds to step S60.

In step S60, the correction target color acquisition unit 20 reads, from the storage unit 14, to acquire the gradation value and the color value of one wide-area corrected gray different from the wide-area corrected gray which has been already acquired as a gradation value and color value of new target wide-area corrected gray among the wide-area corrected grays corresponding to the detailed neighborhood gray that has been printed out. The process then returns to step S58.

When the gray correction processing is ended, the TRC generation unit 15 generates a single-color TRC (gray-corrected single-color TRC) in which the corrected gradation values calculated in steps S28, S53, and S38 are reflected in the single-color TRC generated in step S21 and updates the single-color TRC already stored in the storage unit 14. After that, the image processing unit 18 performs the calibration processing using the single-color TRC (the gray-corrected single-color TRC), and thus the input gradation value is converted into the output gradation value.

As described above, in the image processing apparatus 1 according to the present embodiment, the correction target color acquisition unit 20 acquires the color values measured by the colorimeter 4 from the wide-area correction chart 85 printed out from the image forming apparatus 2 based on the gradation value of the wide-area corrected gray in the second state. When TRC generation unit 15 determines that the corrected gradation value calculated for the first time needs to be corrected, the image forming apparatus 2 prints out the detailed neighborhood chart 90 based on the plurality of gradation values of the detailed neighborhood gray. The prediction model generation unit 12 acquires the color values measured by the colorimeter 4 from the detailed neighborhood chart 90 in the second state. After the calculation of the gradation value of the wide-area corrected gray, the calculated gradation value of the wide-area corrected gray is printed out once, and then it is determined whether the calculation of the gradation value of the detailed corrected gray, which is corresponding to the second correction, is performed. As a result, when the correction accuracy is sufficiently maintained with a single correction, the extra colorimetry of the patch and the extra calculation of the corrected gradation value are omitted. As a result, when there is a gradation value of a target gray that has achieved a color difference that is allowed by single correction, the workload and the operation time of the colorimetry processing performed by the user can be further reduced.

Third Embodiment

An information processing system 100 according to a third embodiment of the present disclosure is described focusing on differences from the information processing system 100 according to the first embodiment. In the first embodiment, even if sufficient correction can be performed by the first correction using the wide-area neighborhood color change prediction model, the operation of printing out the wide-area corrected gray for checking the first correction result and simultaneously printing out the detailed neighborhood gray for generating the detailed neighborhood color change prediction model has been described. In the third embodiment, a description is given below of an operation in which, after a new single-color TRC is generated and the target and wide-area neighborhood chart 60 is printed out, the user sets whether to perform the second correction on the gradation values of the respective target grays, in other words, whether to calculate the gradation values of the detailed corrected grays. The overall configuration of the information processing system 100, the hardware configuration and the functional blocks configuration of the image processing apparatus 1, and the structure and the hardware configuration of the image forming apparatus 2 according to the present embodiment are the same as those described in the first embodiment.

Figure 25:
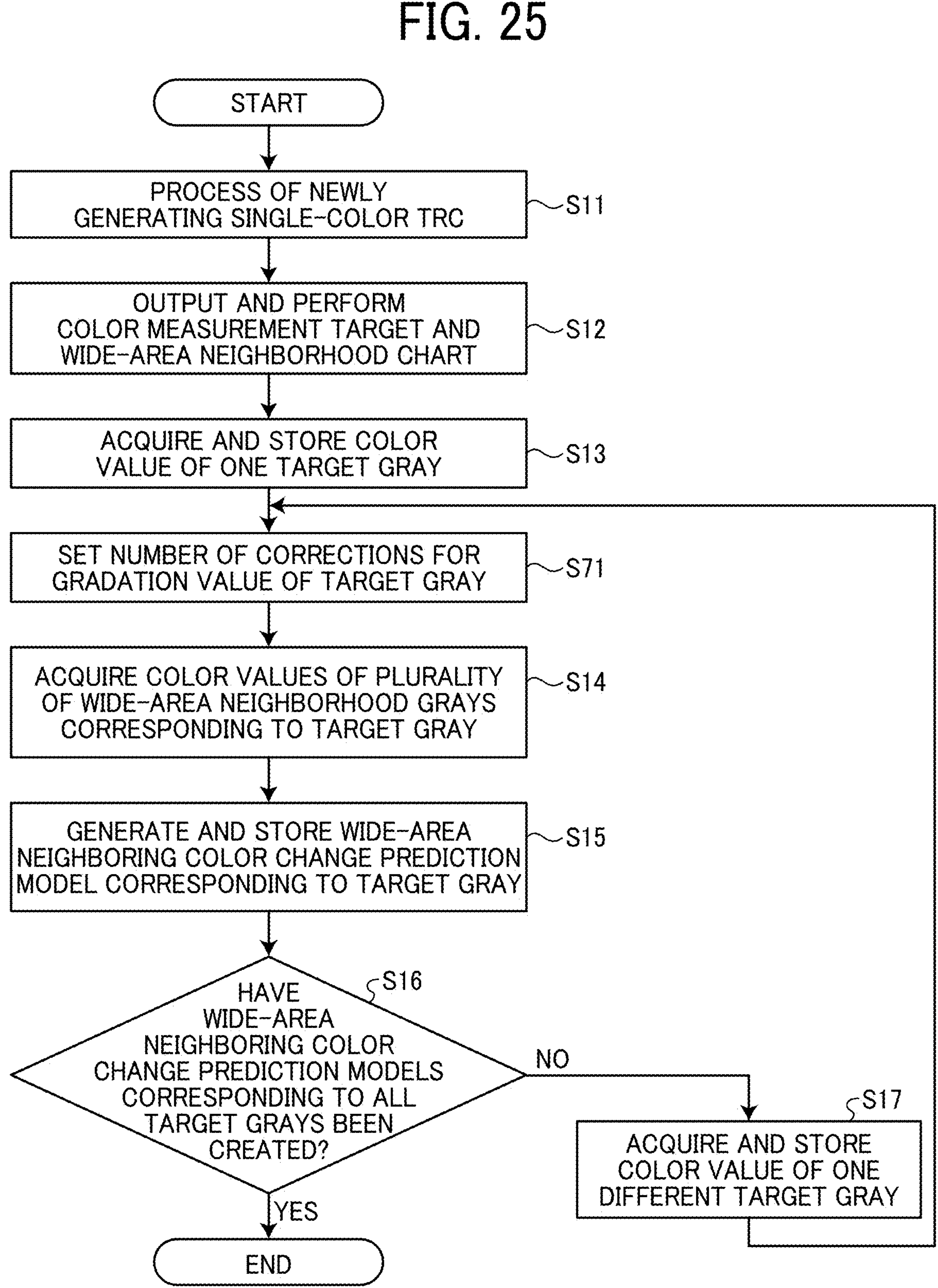
FIG. 25 is a flowchart of a process of target gray and wide-area neighborhood gray acquisition of an image processing apparatus according to a third embodiment of the present disclosure.
Figures 26, 27A:
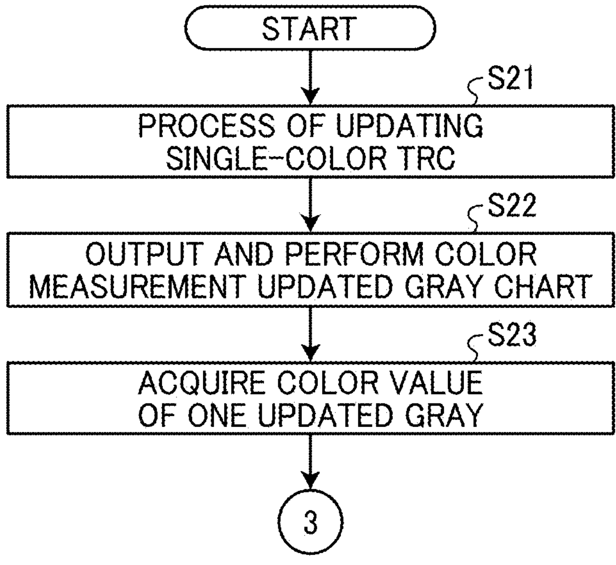

FIG. 25 is a flowchart of a process of target gray and wide-area neighborhood gray acquisition of the image processing apparatus 1 according to a third embodiment of the present disclosure. FIG. 26 is a diagram illustrating the gradation values, color values, and number of corrections of the target gray. A description is given below of the process of target gray and wide-area neighborhood gray acquisition of the image processing apparatus 1 according to the present embodiment with reference to FIGS. 25 and 26.

The processing of steps S11 to S13 illustrated in FIG. 25 are the same as the processing of steps S11 to S13 illustrated in FIG. 8 described above. The process then proceeds to step S71.

In step S71, the setting unit 21 of the image processing apparatus 1 sets the number of corrections to be one or two for the gradation value of the target gray in accordance with the user's operation, and stores the set number of corrections in the storage unit 14. In other words, the setting unit 21 sets, for the target gray, whether to calculate the corrected gradation value (second corrected gradation value) of the target wide-area corrected gray corresponding to the target gray. FIG. 26 illustrates an example of the gradation values, the color values, and the number of corrections of each target gray acquired by the colorimetric value acquisition unit 11. The process then proceeds to step S14.

The processing of steps S14 to S17 illustrated in FIG. 25 are the same as the processing of steps S14 to S17 illustrated in FIG. 8 described above.

Figure 27C:
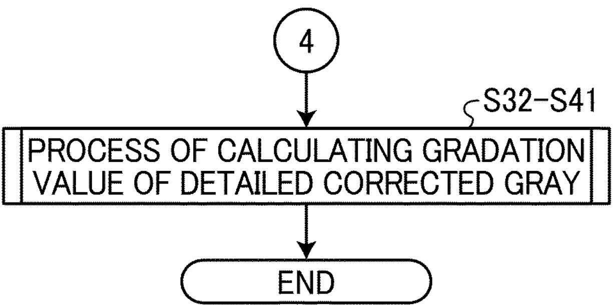

FIGS. 27A, 27B and 27C are flowcharts of gray correction processing of the image processing apparatus 1 according to the third embodiment of the present disclosure. A description is given below of the processing flow of the gray correction processing of the image processing apparatus 1 according to the present embodiment with reference to FIGS. 27A, 27B and 27C.

The processing of steps S21 to S23 illustrated in FIG. 27 are the same as the processing of steps S21 to S23 illustrated in FIG. 13A described above. The process then proceeds to step S24*a*.

In step S24*a*, the TRC generation unit 15 of the image processing apparatus 1 reads the color value, the gradation value, and the number of corrections of the target gray corresponding to the updated target gray, in other words, reads the color value, the gradation value, and the number of corrections of the target gray having the same gradation value as the gradation value of the updated target gray from the storage unit 14. The process then proceeds to step S25.

The processing of steps S25 to S28 illustrated in FIG. 27 are the same as the processing of steps S25 to S28 illustrated in FIG. 13A described above. The process then proceeds to step S81.

In step S81, the TRC generation unit 15 determines whether the number of corrections of the target gray corresponding to the updated target gray set by the setting unit 21 is two. When the number of corrections is two (YES in step S81), the process proceeds to step S82. When the number of corrections is one (NO in step S81), the process proceeds to step S83.

In step S82, the TRC generation unit 15 determines to print out the patches of the wide-area corrected gray and the detailed neighborhood gray corresponding to the updated target gray. The process then proceeds to step S29.

In step S83, the TRC generation unit 15 determines not to print out the patches of the wide-area corrected gray and the detailed neighborhood gray corresponding to the updated target gray. In other words, the gradation value of the wide-area corrected gray calculated as the corrected gradation value of the target gray corresponding to the updated target gray stored in the storage unit 14 in the above-described step S278 is determined. The process then proceeds to step S29.

In step S29, the TRC generation unit 15 determines whether the calculation of the color difference from the color value of the corresponding target gray, the determination of threshold value, and the determination of the number of corrections (the processing of steps S24*a*, S25 to S28, and S81 to S83) have been finished for all gradation values of the updated target gray. When the TRC generation unit 15 determines that the calculation of the color difference and the determination of threshold value have been finished (YES in step S29), the process proceeds to step S31. When the TRC generation unit 15 determines that the calculation of the color difference and the determination of threshold value have not been finished (NO in step S29), the process proceeds to step S30.

In step S30, the correction target color acquisition unit 20 acquires one color value of the updated gray different from the color value which has been already acquired among the color values of the patches 71*a* of the updated gray chart 70 acquired by the colorimetric value acquisition unit 11 as a new color value of the updated target gray. The process then returns to step S24*a*.

In step S31*a*, the display control unit 22 of the image processing apparatus 1 displays, for example, the corrected gradation value of the target gray calculated by the TRC generation unit 15 on the display 508. Then, the chart generation unit 16 generates, for example, the wide-area correction and detailed neighborhood chart 80 as illustrated in FIG. 18. The wide-area correction and detailed neighborhood chart 80 does not include the patches of the wide-area corrected gray and the detailed neighborhood gray corresponding to the target gray corresponding to the updated gray whose color difference is determined to be less than the predetermined threshold value by the TRC generation unit 15 in step S26, and the patches of the wide-area corrected gray and the detailed neighborhood gray corresponding to the target gray whose correction count is determined to be one in step S81. The process then proceeds to step S32.

The processing of steps S32 to S41 illustrated in FIG. 27 are the same as the processing of steps S32 to S41 illustrated in FIG. 13B described above.

When the gray correction processing is ended, the TRC generation unit 15 generates a single-color TRC (gray-corrected single-color TRC) in which the corrected gradation values calculated or determined in steps S28, S83, S38, and S39 are reflected in the single-color TRC generated in step S21 and updates the single-color TRC already stored in the storage unit 14. After that, the image processing unit 18 performs the calibration processing using the single-color TRC (the gray-corrected single-color TRC), and thus the input gradation value is converted into the output gradation value.

As described above, in the image processing apparatus 1 according to the present embodiment, the setting unit 21 sets whether to calculate the corrected gradation value of the wide-area corrected gray for the target gray in accordance with the user's operation input. The TRC generation unit 15 determines that the correction gradation value of the target gray needs to be corrected when the correction gradation value of the wide-area corrected gray is set to be calculated by the setting unit 21. When the correction gradation value of the target gray needs to be corrected, TRC generation unit 15 calculates the correction gradation value of the wide-area corrected gray. Since the user can set whether to calculate the corrected gradation value of the wide-area corrected gray for the target gray (i.e., set the number of corrections to one or two), for example, the user can set the number of corrections to two when the color variation of gray of the highlight gradation is particularly noticeable and user can set the number of corrections to one for other gradations. Thus, it is possible to reduce the workload and operation time associated with wasteful print output and colorimetry processing for gradations for which high correction accuracy is not desired. As a result, the gradation value of the target gray determined by the user to be sufficient by one correction is corrected once, and the gradation value of the target gray determined to need two corrections is corrected twice as necessary, so that the correction can be performed at a required accuracy level without waste by the minimum required print output and colorimetry.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The program executed by the image processing apparatus 1 according to each of the embodiments described above may be provided by being incorporated in a ROM or the like in advance. The computer program executed by the image processing apparatus 1 according to each of the embodiments described above may be stored in a computer-readable recording medium such as a compact disc-read-only memory (CD-ROM), a flexible disk (FD), a compact disc-recordable (CD-R), or a digital versatile disc (DVD) as a file in an installable format or an executable format and provided as a computer program product. The program executed by the image processing apparatus 1 according to each of the embodiments described above may be stored in a computer connected to a network, such as the Internet, and provided so as to be downloaded via the network. Further, the program executed by the image processing apparatus 1 according to each of the embodiments described above may be provided or distributed via a network, such as the Internet.

The program executed by the image processing apparatus 1 of each of the embodiments described above has a module configuration including each of the functional units described above. In terms of actual hardware, a CPU (processor) reads the program from a ROM and executes the program, and thus each of the functional units described above is loaded on a main storage device and each of the functional units is generated on the main storage device.

A description is given below of some aspects of the present disclosure.

Aspect 1

An image processing apparatus performs color matching of gradation values of the same target color acquired in each of two different states. The image processing apparatus includes a first acquisition unit, a second acquisition unit, a third acquisition unit and a calculation unit.

In a first state, the first acquisition unit acquires first color values of respective patches. Each of patches is corresponded to first gradation values respectively. The first gradation values are measured by a colorimeter from a chart printed out from an image forming apparatus based on the first gradation values of a plurality of target mixed colors.

In the first state, the second acquisition unit acquires second color values of respective patches. Each of patches is corresponded to second gradation values respectively. The second gradation values are measured by the colorimeter from a chart printed out by the image forming apparatus based on a plurality of second gradation values in a first color gamut range including the first gradation values.

In a second state different from the first state, the third acquisition unit acquires third color values of patches. The patches corresponded to the first gradation values measured by the colorimeter from a chart printed out from the image forming apparatus based on the first gradation values.

The calculation unit calculates a first corrected gradation value that is corrected first gradation value based on the first gradation value, the first color value corresponding to the first gradation value, the plurality of second gradation values corresponding to the first gradation value, the plurality of second color values corresponding to the plurality of second gradation values respectively, and a gradation value within the first color gamut range.

The third acquisition unit acquires, in the second state, a fourth color value of a patch corresponding to the first corrected gradation value measured by the colorimeter from a chart printed out from the image forming apparatus based on the first corrected gradation value.

In the second state, the second acquisition unit acquires fifth color values of patches. Each of patches is corresponded to third gradation values measured by the colorimeter from a chart printed out from the image forming apparatus based on the plurality of third gradation values within a second color gamut range including the first corrected gradation value and narrower than the first color gamut range.

The calculation unit calculates a second corrected gradation value that is corrected the first corrected gradation value based on the first corrected gradation value, the fourth color value corresponding to the first corrected gradation value, the plurality of third gradation values corresponding to the first corrected gradation value, the plurality of fifth color values corresponding to the plurality of third gradation values respectively, and the gradation value within the second color gamut range.

Aspect 2

The image processing apparatus according to Aspect 1, the second color gamut range is a color gamut range centered on the first corrected gradation value that has dynamically changed from the first gradation value.

Aspect 3

The image processing apparatus according to Aspect 1 or 2, further includes a determination unit. The determination unit determines whether the first gradation value needs to be corrected based on the first color value and the third color value. When the determination unit determines that the first gradation value needs to be corrected, the calculation unit calculates the first corrected gradation value. The determination unit determines whether the first correction gradation value needs to be corrected. When the determination unit determines that the first corrected gradation value needs to be corrected, the calculation unit calculates the second corrected gradation value.

Aspect 4

The image processing apparatus according to any one of Aspects 1 to 5, further include a generation unit. The generation unit generates a first color change prediction model for predicting a color value from gradation values based on a correspondence relation between the first gradation value and the first color value corresponding to the first gradation value and a correspondence relation between the second gradation values and the second color values corresponding to the second gradation values respectively.

The calculation unit calculates the first corrected gradation value using a color value predicted by the first color change prediction model from the gradation values within the first color gamut range.

The generation unit generates a second color change prediction model for predicting a color value from a gradation value based on a correspondence relation between the first corrected gradation value and the fourth color value corresponding to the first corrected gradation value and a correspondence relation between the third gradation values and the fifth color values corresponding to the third gradation values respectively.

The calculation unit calculates the second corrected gradation value using a color value predicted by the second color change prediction model from the gradation value within the second color gamut range.

Aspect 5

In the image processing apparatus according to Aspect 4, the calculation unit calculates the first corrected gradation value when the difference between a first predicted color value and the first color value are equal to or less than a predetermined threshold value. The first predicted color value is calculated by adding the difference between a first model predicted color value and a second model predicted color value to the third color value corresponding to the first gradation value. The first model predicted color value is predicted by the first color change prediction model from the first gradation value. The second model is predicted color value predicted by the first color change prediction model from any gradation value selected from the first color gamut range. The gradation value selected from the first color gamut range is set to the first corrected gradation value.

The calculation unit calculates the second corrected gradation value when the difference between a second predicted color value and the first color value are equal to or less than a predetermined threshold value. The second predicted color value is calculated by adding the difference between a third model predicted color value and a fourth model predicted color value to the fourth color value corresponding to the first corrected gradation value. The third model predicted color value is predicted by the second color change prediction model from the first corrected gradation value. The fourth model predicted color value is predicted by the second color change prediction model from any gradation value selected from the second color gamut range. The gradation value selected from the second color gamut range is set to the second corrected gradation value.

Aspect 6

In the image processing apparatus according to any one of Aspects 1 to 5, in the second state, the third acquisition unit acquires the fourth color value of patch corresponding to the first corrected gradation value measured by the colorimeter from a first chart printed out from the image forming apparatus based on the first corrected gradation value and the plurality of third gradation values.

In the second state, the second acquisition unit acquires the fifth color values of the patches corresponding to each of the third gradation values measured by the colorimeter from the first chart.

Aspect 7

In the image processing apparatus according to Aspect 3, in the second state, the third acquisition unit acquires the fourth color value of the patch corresponding to the first corrected gradation value measured by the colorimeter from a second chart printed out from the image forming apparatus based on the first corrected gradation value.

When the determination unit determines that the first correction gradation value needs to be corrected, the image forming apparatus prints out a third chart based on the plurality of third gradation values.

In the second state, the second acquisition unit acquires the fifth color values of the patches corresponding to the third gradation values respectively measured by the colorimeter from the third chart.

Aspect 8

The image processing apparatus according to Aspect 3, further includes a setting unit. The setting unit sets whether to calculate the second corrected gradation value for each of the first gradation values in accordance with an operation input.

When the setting unit sets to calculate the second correction gradation value, the determination unit determines that the first correction gradation value needs to be corrected.

When the determination unit determines that the first correction gradation value needs to be corrected, the calculation unit calculates the second correction gradation value.

Aspect 9

In the image processing apparatus according to Aspects 1 to 8, the second state is a state in which the passage of time or the change in environment has occurred from the first state.

Aspect 10

The image processing apparatus according to any one of Aspects 1 to 9, the target mixed color is gray acquired by mixing cyan, magenta, and yellow with the same gradation value.

Aspect 11

An information processing system includes the image forming apparatus, the colorimeter that acquires the first color value, the second color value, the third color value, the fourth color value, and the fifth color value, and the image processing apparatus according to any one of Aspects 1 to 10.

Aspect 12

An image processing method performs color matching of gradation values of the same target color acquired in each of two different states. The image processing method includes:

- acquiring, in a first state, first color values of respective patches corresponding to first gradation values respectively which are measured by a colorimeter from a chart printed out from an image forming apparatus based on the first gradation values of a plurality of target mixed colors;
- acquiring, in the first state, second color values of respective patches corresponding to second gradation values respectively which are measured by the colorimeter from a chart printed out by the image forming apparatus based on a plurality of second gradation values in a first color gamut range including the first gradation values;
- acquiring, in a second state different from the first state, third color values of patches corresponding to the first gradation values measured by the colorimeter from a chart printed out from the image forming apparatus based on the first gradation values;
- calculating the first gradation value, the first color value corresponding to the first gradation value, the plurality of second gradation values corresponding to the first gradation value, the plurality of second color values corresponding to the plurality of second gradation values respectively, and a first corrected gradation value that is corrected first gradation value based on a gradation value within the first color gamut range;
- acquiring, in the second state, a fourth color value of a patch corresponding to the first corrected gradation value measured by the colorimeter from a chart printed out from the image forming apparatus based on the first corrected gradation value;
- acquiring, in the second state, fifth color values of patches corresponding to third gradation values measured by the colorimeter from a chart printed out from the image forming apparatus based on the plurality of third gradation values within a second color gamut range including the first corrected gradation value and narrower than the first color gamut range; and
- calculating a second corrected gradation value that is corrected the first corrected gradation value based on the first corrected gradation value, the fourth color value corresponding to the first corrected gradation value, the plurality of third gradation values corresponding to the first corrected gradation value, the plurality of fifth color values corresponding to the plurality of third gradation values respectively, and the gradation value within the second color gamut range.

Aspect 13

A program is performed by a computer to perform color matching of gradation values of the same target color acquired in each of two different states. The process includes:

- acquiring, in a first state, first color values of respective patches corresponding to first gradation values respectively which are measured by a colorimeter from a chart printed out from an image forming apparatus based on the first gradation values of a plurality of target mixed colors;

acquiring, in the first state, second color values of respective patches corresponding to second gradation values respectively which are measured by the colorimeter from a chart printed out by the image forming apparatus based on a plurality of second gradation values in a first color gamut range including the first gradation values;

acquiring, in a second state different from the first state, third color values of patches corresponding to the first gradation values measured by the colorimeter from a chart printed out from the image forming apparatus based on the first gradation values;

calculating the first gradation value, the first color value corresponding to the first gradation value, the plurality of second gradation values corresponding to the first gradation value, the plurality of second color values corresponding to the plurality of second gradation values respectively, and a first corrected gradation value that is corrected first gradation value based on a gradation value within the first color gamut range;

acquiring, in the second state, a fourth color value of a patch corresponding to the first corrected gradation value measured by the colorimeter from a chart printed out from the image forming apparatus based on the first corrected gradation value;

acquiring, in the second state, fifth color values of patches corresponding to third gradation values measured by the colorimeter from a chart printed out from the image forming apparatus based on the plurality of third gradation values within a second color gamut range including the first corrected gradation value and narrower than the first color gamut range; and calculating a second corrected gradation value that is corrected the first corrected gradation value based on the first corrected gradation value, the fourth color value corresponding to the first corrected gradation value, the plurality of third gradation values corresponding to the first corrected gradation value, the plurality of fifth color values corresponding to the plurality of third gradation values respectively, and the gradation value within the second color gamut range.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image processing apparatus for performing color matching of gradation values of the same target color acquired in each of two different states, the image processing apparatus comprising:

processing circuitry configured to:

acquire, in a first state, first color values of patches respectively corresponding to first gradation values, the first gradation values being measured by a colorimeter from a chart printed out by an image forming apparatus based on the first gradation values of a plurality of target mixed colors;

acquire, in the first state, second color values of patches respectively corresponding to second gradation values, the second gradation values being measured by the colorimeter from a chart printed out by the image forming apparatus based on the second gradation values, the second gradation values being within a first color gamut range including the first gradation values;

acquire, in a second state different from the first state, third color values of patches respectively corresponding to the first gradation values measured by the colorimeter from the chart printed out by the image forming apparatus based on the first gradation values;

calculate a first corrected gradation value based on a first gradation value, a first color value corresponding to the first gradation value, a plurality of the second gradation values corresponding to the first gradation value, a plurality of the second color values corresponding to the plurality of the second gradation values, and a gradation value within the first color gamut range;

acquire, in the second state, a fourth color value of a patch corresponding to the first corrected gradation value measured by the colorimeter from a chart printed out by the image forming apparatus based on the first corrected gradation value;

acquire, in the second state, fifth color values of patches corresponding to third gradation values measured by the colorimeter from a chart printed out by the image forming apparatus based on the third gradation values, the third gradation values being within a second color gamut range narrower than the first color gamut range and including the first corrected gradation value; and calculate a second corrected gradation value based on the first corrected gradation value, the fourth color value corresponding to the first corrected gradation value, a plurality of the third gradation values corresponding to the first corrected gradation value, a plurality of the fifth color values corresponding to the plurality of the third gradation values respectively, and a gradation value within the second color gamut range.

2. The image processing apparatus according to claim 1, wherein the second color gamut range is centered on the first corrected gradation value that has dynamically changed from the first gradation value.

3. The image processing apparatus according to claim 1, wherein the processing circuitry is configured to:

determine whether to correct the first gradation value based on the first color value and the third color values:

calculate the first corrected gradation value when the first gradation value is determined to be corrected;

determine whether to correct the first corrected gradation value; and calculate the second corrected gradation value when the first corrected gradation value is determined to be corrected.

4. The image processing apparatus according to claim 1, wherein the processing circuitry is configured to:

generate a first color change prediction model for predicting a color value from gradation values based on a correspondence between the first gradation value and the first color value and a correspondence between the second gradation values and the second color values;

calculate the first corrected gradation value using a color value predicted by the first color change prediction model from the gradation value within the first color gamut range;

generate a second color change prediction model for predicting a color value from a gradation value based on a correspondence between the first corrected gradation value and the fourth color value and a correspondence between the third gradation values and the fifth color values; and calculate the second corrected gradation value using a color value predicted by the second color change prediction model from the gradation value within the second color gamut range.

5. The image processing apparatus according to claim 4, wherein the processing circuitry is configured to:

calculate the first corrected gradation value when a difference between a first predicted color value and the first color value is equal to or less than a threshold value, the first predicted color value being calculated by adding a difference between a first model predicted color value and a second model predicted color value to the third color value corresponding to the first gradation value, the first model predicted color value being predicted by the first color change prediction model from the first gradation value, the second model predicted color value being predicted by the first color change prediction model from any gradation value selected from the first color gamut range, the gradation value selected from the first color gamut range being set to the first corrected gradation value; and calculate the second corrected gradation value when a difference between a second predicted color value and the first color value is equal to or less than a threshold value, the second predicted color value being calculated by adding a difference between a third model predicted color value and a fourth model predicted color value to the fourth color value corresponding to the first corrected gradation value, the third model predicted color value being predicted by the second color change prediction model from the first corrected gradation value, the fourth model predicted color value being predicted by the second color change prediction model from any gradation value selected from the second color gamut range, the gradation value selected from the second color gamut range being set to the second corrected gradation value.

6. The image processing apparatus according to claim 1, wherein the processing circuitry is configured to:

acquire, in the second state, the fourth color value of the patch corresponding to the first corrected gradation value measured by the colorimeter from a first chart printed out by the image forming apparatus based on the first corrected gradation value and the plurality of the third gradation values; and acquire, in the second state, the fifth color values of the patches corresponding to the third gradation values measured by the colorimeter from the first chart.

7. The image processing apparatus according to claim 3, wherein the processing circuitry is configured to:

acquire, in the second state, the fourth color value of the patch corresponding to the first corrected gradation value measured by the colorimeter from a second chart printed out by the image forming apparatus based on the first corrected gradation value;

cause the image forming apparatus to print out a third chart based on the plurality of the third gradation values when the first corrected gradation value is determined to be corrected; and acquire, in the second state, the fifth color values of the patches corresponding to the third gradation values respectively measured by the colorimeter from the third chart.

8. The image processing apparatus according to claim 3, wherein the processing circuitry is configured to:

set whether to calculate the second corrected gradation value for each of the first gradation values in accordance with an operation input;

determine to correct the first corrected gradation value when the second corrected gradation value is determined be calculated; and calculate the second corrected gradation value when the first corrected gradation value is determined to be corrected.

9. The image processing apparatus according to claim 1, wherein the second state is a state in which a time elapses or a change in environment has occurred from the first state.

10. The image processing apparatus according to claim 1, wherein a target mixed color is gray acquired by mixing cyan, magenta, and yellow with the same gradation value.

11. An information processing system comprising:

the image forming apparatus;

the colorimeter configured to acquire the first color values, the second color values, the third color values, the fourth color value, and the fifth color values; and the image processing apparatus according to claim 1.

12. An image processing method for performing color matching of gradation values of the same target color acquired in each of two different states, the method comprising:

acquiring, in a first state, first color values of patches respectively corresponding to first gradation values, the first gradation values being measured by a colorimeter from a chart printed out by an image forming apparatus based on the first gradation values of a plurality of target mixed colors;

acquiring, in the first state, second color values of patches respectively corresponding to second gradation values, the second gradation values being measured by the colorimeter from a chart printed out by the image forming apparatus based on the second gradation values, the second gradation values being within a first color gamut range including the first gradation values;

acquiring, in a second state different from the first state, third color values of patches respectively corresponding to the first gradation values measured by the colorimeter from the chart printed out by the image forming apparatus based on the first gradation values;

calculating a first corrected gradation value based on a first gradation value, a first color value corresponding to the first gradation value, a plurality of the second gradation values corresponding to the first gradation value, a plurality of the second color values corresponding to the plurality of the second gradation values, and a gradation value within the first color gamut range;

acquiring, in the second state, a fourth color value of a patch corresponding to the first corrected gradation value measured by the colorimeter from a chart printed out by the image forming apparatus based on the first corrected gradation value;

acquiring, in the second state, fifth color values of patches corresponding to third gradation values measured by the colorimeter from a chart printed out by the image forming apparatus based on the third gradation values, the third gradation values being within a second color gamut range narrower than the first color gamut range and including the first corrected gradation value; and calculating a second corrected gradation value based on the first corrected gradation value, the fourth color value corresponding to the first corrected gradation value, a plurality of the third gradation values corresponding to the first corrected gradation value, a plurality of the fifth color values corresponding to the plurality of the third gradation values respectively, and a gradation value within the second color gamut range.

13. A non-transitory storage medium storing computer-readable program code that, when executed by a computer, causes the computer to perform a method for performing color matching of gradation values of the same target color acquired in each of two different states, the method comprising:

acquiring, in a first state, first color values of patches respectively corresponding to first gradation values, the first gradation values being measured by a colorimeter from a chart printed out by an image forming apparatus based on the first gradation values of a plurality of target mixed colors;

acquiring, in the first state, second color values of patches respectively corresponding to second gradation values, the second gradation values being measured by the colorimeter from a chart printed out by the image forming apparatus based on the second gradation values, the second gradation values being within a first color gamut range including the first gradation values;

acquiring, in a second state different from the first state, third color values of patches respectively corresponding to the first gradation values measured by the colorimeter from the chart printed out by the image forming apparatus based on the first gradation values;

calculating a first corrected gradation value based on a first gradation value, a first color value corresponding to the first gradation value, a plurality of the second gradation values corresponding to the first gradation value, a plurality of the second color values corresponding to the plurality of the second gradation values, and a gradation value within the first color gamut range;

acquiring, in the second state, a fourth color value of a patch corresponding to the first corrected gradation value measured by the colorimeter from a chart printed out by the image forming apparatus based on the first corrected gradation value, acquiring, in the second state, fifth color values of patches corresponding to third gradation values measured by the colorimeter from a chart printed out by the image forming apparatus based on the third gradation values, the third gradation values being within a second color gamut range narrower than the first color gamut range and including the first corrected gradation value; and calculating a second corrected gradation value based on the first corrected gradation value, the fourth color value corresponding to the first corrected gradation value, a plurality of the third gradation values corresponding to the first corrected gradation value, a plurality of the fifth color values corresponding to the plurality of the third gradation values respectively, and a gradation value within the second color gamut range.

* * * * *